(12) United States Patent
Tanev et al.

(10) Patent No.: US 12,521,696 B2
(45) Date of Patent: Jan. 13, 2026

(54) EXHAUST GAS EMISSIONS ABATEMENT SYSTEM

(71) Applicant: SHELL USA, INC., Houston, TX (US)

(72) Inventors: Peter Tanev Tanev, Houston, TX (US); Shaojun Miao, Houston, TX (US); Mario Soorholtz, Mannheim (DE)

(73) Assignee: SHELL USA, INC.

( * ) Notice: Subject to any disclaimer, the term of this patent is extended or adjusted under 35 U.S.C. 154(b) by 312 days.

(21) Appl. No.: 18/001,615

(22) PCT Filed: Nov. 11, 2020

(86) PCT No.: PCT/US2020/059941
§ 371 (c)(1),
(2) Date: Dec. 13, 2022

(87) PCT Pub. No.: WO2021/262219
PCT Pub. Date: Dec. 30, 2021

(65) Prior Publication Data
US 2023/0219064 A1    Jul. 13, 2023

Related U.S. Application Data

(60) Provisional application No. 63/044,002, filed on Jun. 25, 2020.

(51) Int. Cl.
*B01J 21/04*    (2006.01)
*B01D 53/94*    (2006.01)
(Continued)

(52) U.S. Cl.
CPC ............ *B01J 21/04* (2013.01); *B01D 53/944* (2013.01); *B01D 53/9477* (2013.01);
(Continued)

(58) Field of Classification Search
None
See application file for complete search history.

(56) References Cited

U.S. PATENT DOCUMENTS

| | | | |
|---|---|---|---|
| 4,579,729 | A | 4/1986 | Schoenthal et al. |
| 10,525,412 | B2 | 1/2020 | Chen et al. |

(Continued)

FOREIGN PATENT DOCUMENTS

| | | |
|---|---|---|
| CN | 109755616 A | 5/2019 |
| JP | 2001132923 A | 5/2001 |
| RU | 2650495 C1 | 4/2018 |

OTHER PUBLICATIONS

Hupa et al. Limestone and Dolomite as Sulfur Absorbents under Pressurized Gasification Conditions. Fuel. vol. 75, Issue 1, Jan. 1996, pp. 89-95. [online] [retrieved on Mar. 27, 2025]. https://www.sciencedirect.com/science/article/pii/0016236195002049 (Year: 1996).*

(Continued)

*Primary Examiner* — Jelitza M Perez
(74) *Attorney, Agent, or Firm* — SHELL USA, INC.

(57) ABSTRACT

A system for removing methane oxidation catalyst (MOC) poisons from an exhaust gas including a methane abatement unit that may receive the exhaust gas having methane ($CH_4$) and the MOC poisons. The methane abatement unit includes a guard bed that may remove the MOC poisons from the exhaust gas and may generate an intermediate exhaust gas having the $CH_4$ and devoid of the MOC poisons. The guard bed includes a MOC poisons capturing component having a first transition metal oxide, an aluminum oxide ($Al_2O_3$) support material, and a dolomite-derived support material. The methane abatement unit also includes a MOC bed fluidly coupled to and positioned downstream from the guard bed. The MOC bed includes a MOC and may remove $CH_4$ from the intermediate exhaust gas to generate a treated (Continued)

exhaust gas having less than approximately 200 parts per million volume (ppmv) $CH_4$.

18 Claims, 7 Drawing Sheets

(51) Int. Cl.

| | | |
|---|---|---|
| *B01J 23/02* | (2006.01) | |
| *B01J 23/04* | (2006.01) | |
| *B01J 23/34* | (2006.01) | |
| *B01J 23/72* | (2006.01) | |
| *B01J 23/755* | (2006.01) | |
| *B01J 23/83* | (2006.01) | |
| *B01J 35/63* | (2024.01) | |
| *F01N 3/28* | (2006.01) | |

(52) U.S. Cl.
CPC ............ *B01J 23/02* (2013.01); *B01J 23/04* (2013.01); *B01J 23/34* (2013.01); *B01J 23/72* (2013.01); *B01J 23/755* (2013.01); *B01J 23/83* (2013.01); *B01J 35/635* (2024.01); *B01J 35/638* (2024.01); *F01N 3/2803* (2013.01); *B01D 2255/1021* (2013.01); *B01D 2255/1023* (2013.01); *B01D 2255/1025* (2013.01); *B01D 2255/2022* (2013.01); *B01D 2255/2045* (2013.01); *B01D 2255/2065* (2013.01); *B01D 2255/2073* (2013.01); *B01D 2255/20753* (2013.01); *B01D 2255/20761* (2013.01); *B01D 2255/9022* (2013.01); *B01D 2255/904* (2013.01); *B01D 2255/9205* (2013.01); *B01D 2257/302* (2013.01); *B01D 2257/55* (2013.01); *B01D 2257/60* (2013.01); *F01N 2370/02* (2013.01)

(56) References Cited

U.S. PATENT DOCUMENTS

| | | |
|---|---|---|
| 11,131,225 B2 | 9/2021 | Liu et al. |
| 2005/0112056 A1* | 5/2005 | Hampden-Smith ............ B01J 20/3483 502/415 |
| 2016/0236147 A1* | 8/2016 | Chen ............ F01N 3/085 |
| 2019/0015778 A1 | 1/2019 | Sindram et al. |

OTHER PUBLICATIONS

International Search Report and Written Opinion received for PCT Patent Application No. PCT/US2020/059941, mailed on Jan. 19, 2021, 10 pages.

Majewski et al., "Methane Oxidation Catalysts", Dieselnet Technology Guide, Jan. 2020, pp. 1-20.

Office Action Received for Japanese Application No. 2022-580039, Mailed on Aug. 6, 2024, 8 Pages(3 Pages of English Translation and 5 Pages of Official Copy).

* cited by examiner

EXHAUST GAS EMISSIONS ABATEMENT SYSTEM

CROSS REFERENCE TO RELATED APPLICATION

This is a National stage application of International Application No. PCT/US2020/059941, filed 11 Nov. 2020, which claims priority of U.S. Provisional Application No. 63/044,002, filed 25 Jun. 2020 which is incorporated herein by reference in its entirety.

BACKGROUND OF THE DISCLOSURE

The present disclosure relates generally to the field of abating exhaust gas emissions and specifically to abating methane emissions from natural gas fueled engines. More specifically, the present disclosure relates to a dual bed methane emissions abatement system having a guard bed for converting, capturing, or otherwise removing methane oxidation catalyst poisons from exhaust gas generated from natural gas fuel engines and a methane oxidation catalyst (MOC) bed for converting and abating the methane emissions in the exhaust gas.

Natural gas is an abundant and economical alternative to oil-derived fuels such as gasoline, kerosene and diesel. Accordingly, manufactures of engines used in stationery and transport applications/service are shifting their attention and efforts from oil-derived fuels to compressed natural gas (CNG) or liquefied natural gas (LNG) as fuels. Both CNG and LNG are less expensive and burn cleaner than oil-derived fuels. For example, compared to certain oil-derived fuels, CNG and LNG, when burned, emit approximately 75% less greenhouse gases such as carbon dioxide ($CO_2$), carbon monoxide (CO) and nitrogen oxides (NOx). In addition, the CNG and LNG produce significantly less particulates relative to oil-derived fuels. CNG and LNG are primarily (>90%) composed of methane ($CH_4$). $CH_4$ is a more potent greenhouse gas than $CO_2$. Therefore, while using CNG and LNG decreases overall emissions compared to oil-derived fuels, incomplete burning of CNG and LNG may result in undesirable emissions of $CH_4$, i.e. high $CO_2$ equivalent. Therefore, there is a current need to treat engine exhaust gases generated from burning of CNG or LNG fuels in order to remove or abate the undesirable $CH_4$ emissions before releasing the exhaust gas from the system.

SUMMARY

In a first embodiment, a system for removing methane oxidation catalyst (MOC) poisons from an exhaust gas including a methane abatement unit that may receive the exhaust gas having methane ($CH_4$) and the MOC poisons. The methane abatement unit includes a guard bed that may remove the MOC poisons from the exhaust gas and may generate an intermediate exhaust gas having the $CH_4$ and devoid of the MOC poisons. The guard bed includes a MOC poisons capturing component having a first transition metal oxide, an aluminum oxide ($Al_2O_3$) support material, and a dolomite-derived support material. The methane abatement unit also includes a MOC bed fluidly coupled to and positioned downstream from the guard bed. The MOC bed includes a MOC and may remove $CH_4$ from the intermediate exhaust gas to generate a treated exhaust gas having less than approximately 200 parts per million volume (ppmv) $CH_4$.

In another embodiment, a method for removing methane oxidation catalyst (MOC) poisons from an exhaust gas including feeding the exhaust gas having methane ($CH_4$) and the MOC poisons to a methane abatement unit including a guard bed and a MOC bed fluidly coupled to and downstream from the guard bed and contacting the exhaust gas with a MOC poisons capturing component disposed within the guard bed. The MOC poisons capturing component includes a first transition metal oxide, an aluminum oxide ($Al_2O_3$) support material, and a dolomite-derived support material. The method also includes removing the MOC poisons from the exhaust gas to generate an intermediate exhaust gas devoid of MOC poisons and comprising the $CH_4$.

In another embodiment, a methane oxidation catalyst (MOC) poisons capturing component for removing MOC poisons from an exhaust gas including an aluminum oxide ($Al_2O_3$) support material having a first porosity, a dolomite-derived support material having a second porosity that is less than the first porosity; and a first transition metal oxide supported on the $Al_2O_3$ support material, the dolomite-derived support material, or both. A concentration of the first transition metal oxide is between approximately 1-25 weight % (wt %) and the MOC poisons capturing component removes sulfur dioxide ($SO_2$), phosphorus (P), calcium (Ca), zinc (Zn), silicon (Si) and ash.

Additional features and advantages of exemplary implementations of the disclosure will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description, and appended claims, or may be learned by the practice of such exemplary implementations as set forth hereinafter.

BRIEF DESCRIPTION OF THE DRAWINGS

Advantages of the disclosure may become apparent upon reading the following detailed description and upon reference to the drawings in which.

DETAILED DESCRIPTION

Figure 1:
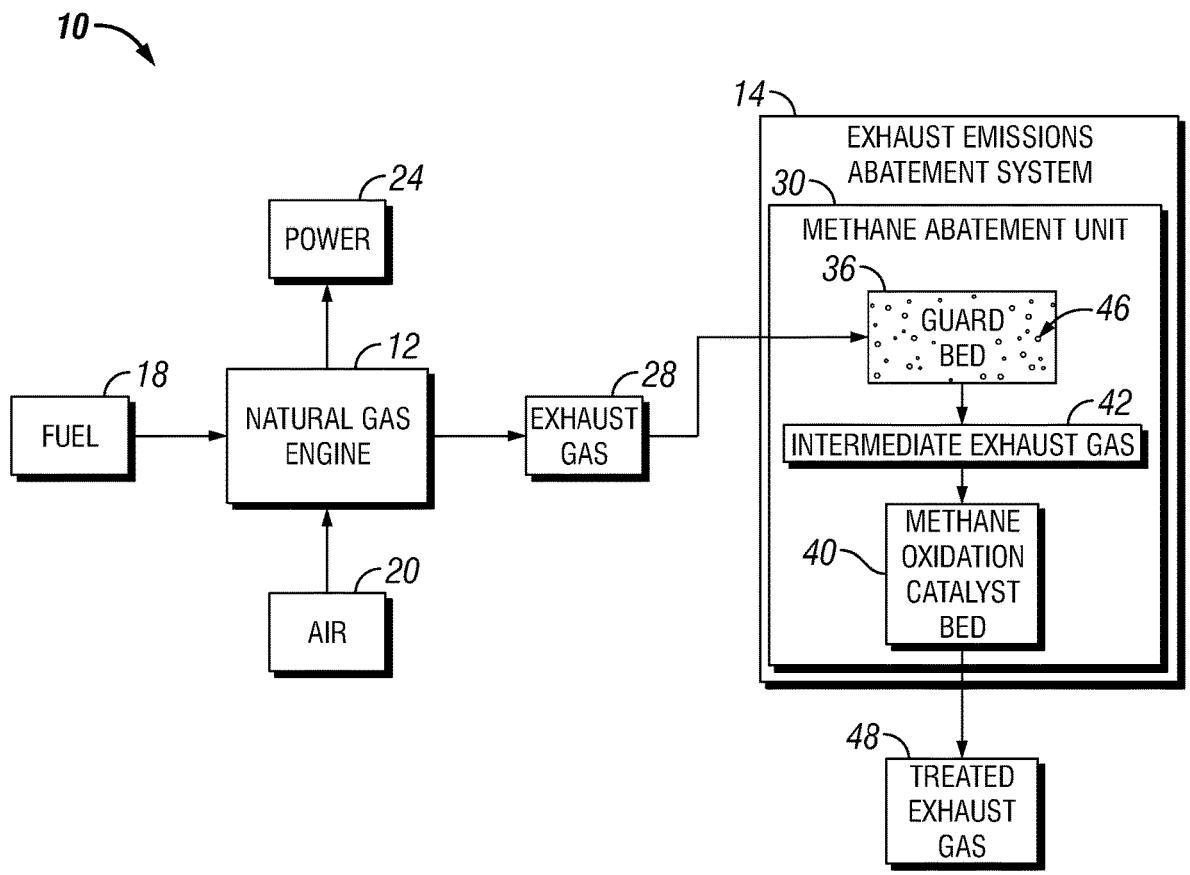
FIG. 1 is a block diagram of a system including a natural gas fueled engine that generates an exhaust gas and an exhaust emissions abatement system having a dual bed methane abatement unit having a methane oxidation catalyst (MOC) poisons capturing component, in accordance with an embodiment of the present disclosure.

One or more specific embodiments of the present disclosure will be described below. These described embodiments are examples of the presently disclosed techniques, which include system, guard bed, and method of use of the system to treat an exhaust gas generated by the system to abate the methane emissions from natural gas fueled engines). Additionally, in an effort to provide a concise description of these embodiments, not all features of an actual implementation may be described in the specification. It should be appreciated that in the development of any such actual implementation, as in any engineering or design project, numerous implementation-specific decisions will be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The terms "approximately," "about," and "substantially" as used herein represent an amount close to the stated amount that still performs a desired function or achieves a desired result. For example, the terms "approximately," "about," and "substantially" may refer to an amount that is within less than 10% of, within less than 5% of, within less than 1% of, within less than 0.1% of, and within less than 0.01% of a stated value.

Natural gas contains between approximately 70% to approximately 95% of methane ($CH_4$). Natural gas, in the form of compressed natural gas (CNG) and/or liquified natural gas (LNG), is more and more utilized as a fuel in place of or in parallel with oil-derived fuels (e.g., gasoline, coal, etc.) for engines in stationary (power, drilling etc.) and transport (marine, railroad, and other on road) applications. For example, an internal combustion engine may combust natural gas (e.g., CNG and LNG) to produce a combustion gas that contains energy that is extracted by the engine components (e.g., pistons, turbines, etc.) to provide power to the system. The combustion gas may contain unburned methane, oxygen ($O_2$), carbon dioxide ($CO_2$), carbon monoxide (CO), nitrogen oxides (NOx), water ($H_2O$), nitrogen ($N_2$) and other gases that exit the system as exhaust gas. The combustion gas from the natural gas engine also contains small levels of sulfur dioxide ($SO_2$). The $SO_2$ in the combustion gas results from small levels (between approximately 0.1 to approximately 8 parts per million (ppm)) of sulfur (S) present in the natural gas as well as that present in the diesel pilot (e.g., for dual fuel engines) and in the lubrication oil. For example, for spark ignited natural gas engines, the level of $SO_2$ in the combustion gas is dependent on the level of S in the natural gas fuel and the S level in the oil as well as on the fuel and oil consumption rates. In addition to the $SO_2$, the combustion gas from natural gas engines also contains small (approximately less than 3000 ppm) levels of other chemical species such as ones having phosphorus (P), zinc (Zn), calcium (Ca), silicon (Si) and others. These latter species are typically present in oil additives. Accordingly, their presence and concentration in the combustion gas is attributable to the consumption of oil and oil consumption rate, respectively. The amount of residual non-methane hydrocarbons (NMHC), particulate matter (ash), $CO_2$ and other emissions present in the exhaust gas generated from combustion of natural gas is significantly less than the amounts of NMHC, PM and $CO_2$ present in an exhaust gas generated from combustion of oil-derived fuels. Accordingly, the use of natural gas for power generation decreases these particular emissions compared to oil-derived fuels.

However, under certain operating conditions, natural gas fueled engines may not completely burn $CH_4$. Accordingly, the unburned $CH_4$ may slip into the exhaust gas and be released from the system. For example, natural gas engines operating under lean fuel (e.g., an oxygen-rich fuel) regime, may generate exhaust gas having between approximately 200 parts per million volume (ppmv) to approximately 3000 ppmv $CH_4$. It has been recognized that $CH_4$ is a more potent greenhouse gas compared to $CO_2$ (e.g., 1 mol of $CH_4 \geq 25$ $CO_2$ mol equivalents). Therefore, it is desirable to develop and deploy an exhaust gas emissions abatement system that may remove or decrease the amount of $CH_4$ slip in such a way so that the $CH_4$ level in the exhaust gas is at or below regulated emission levels (e.g., below approximately 150 to 200 ppmv).

One technique for $CH_4$ abatement includes oxidation of methane in the presence of a methane oxidation catalyst (MOC). In methane oxidation techniques, hot $CH_4$-containing exhaust gas contacts the MOC, which in the presence of $O_2$ catalytically converts $CH_4$ into $CO_2$ and $H_2O$. MOCs generally used for $CH_4$ abatement include at least one active metal oxide supported on a porous inorganic oxide support. By way of non-limiting example, MOCs that may be used for $CH_4$ oxidation or abatement may include noble metal oxides, such as platinum (Pt), palladium (Pd), silver (Ag), iridium (Ir), ruthenium (Ru), rhodium (Rh), osmium (Os) and gold (Au), base metals (e.g., barium (Ba), cesium (Cs), etc.), and rare earth elements (cerium (Ce), yttrium (Y), lanthanum (La), Neodymium (Nd), etc.). In certain embodiments, the MOC may include other elements as dopants or promoters. In addition, the MOC's may contain various porous inorganic oxides as supports (e.g., aluminum oxide ($Al_2O_3$), titanium oxide ($TiO_2$), zirconium oxide ($ZrO_2$), etc.) and mixtures thereof. As appreciated by a person of ordinary skilled in the art, Pd—(in the form of PdO) based MOC's exhibits the highest activity in methane oxidation, i.e. ability to convert and abate methane emissions favorably at the reaction temperatures >300° C. However, noble metal oxide catalysts and in particular PdO-based MOC, are very sensitive to chemical species such as $SO_2$, P, Zn, Ca, and Si that are generally present in the exhaust gas. As such, the performance of the MOC for methane oxidation is adversely affected by some of these chemical species. Hereinafter the chemical species $SO_2$, P, Zn, Ca, and Si, among others, are referred to as MOC poisons. These poisons adversely affect the activity of the MOC for methane oxidation, i.e. the MOC's ability to convert/abate $CH_4$ as well as its performance stability and useful life. The catalyst poisons exert their adverse effect on the MOC by chemically reacting with or physically covering or adsorbing on the active centers of the MOC, and thus preventing the MOC from fully exerting its methane oxidation activity. The main active sites on PdO-based MOCs are oxygen vacancies on the PdO. The methane oxidation reaction proceeds via an intermediate complex formed between these oxygen vacancies and the $CH_4$ molecules in the exhaust gas. The aforementioned catalyst poisons chemically react with the oxygen vacancies on the Pd or physically cover the active sites. As such, the catalyst poisons effectively prevent the active sites from being accessed by and reacting with methane, and thus rendering them inactive for methane oxidation.

For example, at optimal methane oxidation exhaust gas temperatures (e.g., between approximately 300° C. and 600° C. and more specifically between 400° C. and 530° C.), oxygen vacancies in the PdO react with $SO_2$, or its oxidized form $SO_3$, present in the exhaust gas to form stable palladium sulfate ($PdSO_4$). Palladium sulfate is inactive for $CH_4$ oxidation. Additionally, $PdSO_4$ cannot be decomposed under typical $CH_4$ oxidation conditions and in the optimal methane oxidation exhaust gas temperatures. Therefore, the catalytic activity and the overall catalyst performance stability/life of the PdO-based MOC in the presence of $SO_2$ in exhaust gas is adversely affected by the formation of $PdSO_4$. Other catalyst poisons such as P, Zn, Ca, Si, and ash may also react with or physically cover the active sites in the MOC, and thus further contribute to the overall decrease in methane oxidation activity and deactivation of the MOC. Therefore, it may be desirable to develop and deploy, in conjunction with natural gas engines, sulfur and other catalyst poisons capturing devices and techniques in order to remove the catalyst poisons and allow for maintaining the catalytic performance of MOCs placed downstream of such devices at its peak level.

The present disclosure provides embodiments of an exhaust gas emissions abatement system and a method of use, whereby the exhaust gas emission abatement system that includes a dual bed methane abatement unit having a guard bed and a MOC that effectively remove MOC catalyst poisons and abate $CH_4$ emissions from natural gas fueled engines. In addition, the present disclosure provides embodiments of improved guard bed formulations for removal of the MOC catalyst poisons. As discussed in further detail below, the guard bed is positioned upstream of a MOC bed and may include one or more layers of one or more components that convert, capture, or remove, to large extent, the MOC catalyst poisons from the exhaust gas. In this way, the catalyst poisons in the exhaust gas are removed prior to feeding the exhaust gas to the MOC. This allows for the MOC catalyst to fully exert its peak activity and performance in methane oxidation/abatement and therefore, could pave the way for a commercially viable exhaust gas emissions abatement system to abate methane emissions from natural gas engines in stationary or transport service.

With the foregoing in mind, FIG. 1 is a block diagram of an embodiment of a power generation system 10 that may include an exhaust gas emissions abatement system, in accordance with the present disclosure. In operation, the system 10 receives and consumes natural gas to generate power and exhaust gas as a byproduct. As discussed in further detail below, the exhaust gas emissions abatement system treats the exhaust gas in a methane abatement unit to produce treated exhaust gas. In the illustrated embodiment, the system 10 includes a natural gas engine 12 and an exhaust gas emissions abatement system 14 downstream of the natural gas engine 12. The natural gas engine 12 may be a spark ignited engine or dual fuel engine. For example, the natural gas engine 12 may be a heavy-duty engine used in stationary application (e.g., compressor, drilling, and power generation) or one used in transport application (e.g., on road, mining, marine, and rail).

During operation, the natural gas engine 12 receives a natural gas fuel 18 and air 20 and combusts the air-fuel mixture to generate power 24 and an exhaust gas 28. In a spark ignited natural gas engine, the air-fuel mixture is compressed in the cylinders and then sparked with the aid of a spark plugs to provide for the combustion of the mixture. In a dual fuel engine, the natural gas engine 12 may receive a second fuel (e.g., diesel) in addition to the natural gas fuel 18. The amount of the second fuel (diesel) is significantly less (generally between approximately 5-10% of the total fuel) relative to the amount of the natural gas fuel. In this particular instance, the second fuel (diesel) is used as a pilot to spark the main natural gas fuel.

The natural gas engine 12 may operate in either fuel-lean burn mode or fuel-rich burn mode. In the fuel-lean burn mode, the natural gas engine 12 burns the fuel 18 with an excess amount of the air 20 (e.g., oxygen). For example, the air 20 and the fuel 18 may be provided to the natural gas engine 12 in a different ratio. Depending on whether the amount of oxygen in the air (and the total amount of air) is sufficient, larger, or smaller than required to completely burn the fuel, the type of engine operation regime is defined as stoichiometric, fuel-lean (or lean), or fuel rich (or rich). Normally, the burn? type is defined by the air to fuel (AFR) ratio. The AFR ratio may be expressed as the mass of air vs the mass of fuel present in the engine. The AFR value for stoichiometric burn of natural gas is approximately 17.2:1. This implies that in order to have a stoichiometric burn 17.2 parts of air and 1 part of fuel are required. Therefore, an AFR <17.2 corresponds to fuel-rich burn, whereas an AFR>17.2 corresponds to a fuel-lean burn.

By operating the natural gas engine 12 in a fuel-lean burn mode, at least a portion of the oxygen ($O_2$) in the air 20 of the air-fuel mixture remains unreacted and exits the natural gas engine 12 along with the exhaust gas 28. The unreacted $O_2$ in the exhaust gas 28 may be used by the MOC to oxidize the unburned $CH_4$ present in the exhaust gas 28.

In accordance with the present disclosure, the fuel 18 is natural gas in the form of compressed natural gas (CNG), liquified natural gas (LNG), or both. In certain embodiments, the fuel 18 may be a mixture of natural gas and one or more hydrocarbon fuels such as, but not limited to, gasoline, kerosene, diesel, or gasoil. As used herein, "natural gas" is intended to denote a mixture of hydrocarbons having carbon numbers ranging from 1 to 6 ($C_1$-$C_6$ hydrocarbons) containing more $C_1$ hydrocarbons (e.g., methane ($CH_4$)) than the total amount of $C_2$-$C_6$ hydrocarbons. Hydrocarbons having a carbon number from 1 to 6 include, but are not limited to, $CH_4$, ethane ($C_2H_6$), propane ($C_3H_8$), butanes ($C_4H_{10}$), pentanes($CH_{12}$), and hexanes ($C_6H_{14}$). In accordance with the present embodiments, the natural gas may have between approximately 50 percent (%) and approximately 95% or more by volume of $CH_4$. For example, the natural gas may have at least 70% by volume, at least 90% by volume, or at least 95% by volume $CH_4$.

Following combustion, the natural gas engine 12 directs the exhaust gas 28 to the exhaust gas emissions abatement system 14. The exhaust gas emissions abatement system 14 includes a methane abatement unit 30, which treats the exhaust gas 28 to convert, capture, and, to a large extent remove undesirable chemical species such as various catalyst poisons ($SO_2$, P, Zn, Ca, Si, etc.) and $CH_4$, NOx, and other combustion by-products from the exhaust gas 28 before releasing the exhaust gas 28 from the system 10. For example, as discussed above, the exhaust gas 28 may include unburned $CH_4$, oxygen ($O_2$), as well as other undesirable gases such as nitrogen oxides (NOx), carbon monoxide (CO), carbon dioxide ($CO_2$), nitrous oxide (NO), dinitrous oxide ($N_2O$) and other combustion by-products that may need to be removed prior to release of the exhaust gas 28 from the system 10. In certain embodiments, the exhaust gas 28 may include between approximately 100 parts per million volume (ppmv) to approximately 5,000 ppmv of $CH_4$, and more specifically between 200 and 3500 ppmv and even more specifically between 400 and 2500 ppmv of $CH_4$. However, it has now been recognized that a reduction in methane emissions levels (typically in the range of a 70-90% reduction) is needed to meet certain operating standards. For example, it is desirable that the level of $CH_4$ in exhaust gases released from natural gas operated systems be less than approximately 150 to 200 ppmv. Therefore, the exhaust gas 28 is has to be treated in the exhaust gas emissions abatement system 14 in order to reduce and to a very large extent substantially remove the unburned $CH_4$ and other combustion by-products from the exhaust gas 28 before releasing the exhaust gas 28 from the system 10. For example, in operation, the exhaust gas emissions abatement system 14 disclosed herein first treats the exhaust gas 28 in a guard bed 36 to convert, capture, and to substantially remove the MOC catalyst poisons (such as, $SO_2$, Zn, P, Ca, Si, ash, and others), thereby generating a treated intermediate exhaust gas 42. Following removal of the catalyst poisons, the treated intermediate exhaust gas 42 is fed to MOC bed 40, which oxidizes and substantially reduces the $CH_4$ level in the exhaust gas 28, 42 prior to releasing it from the system 10.

As discussed above, one technique for removing $CH_4$ from the exhaust gas 28 is catalytic oxidation of $CH_4$ over the MOC. The MOC converts $CH_4$ via oxidation in the presence and with the participation of $O_2$ into $CO_2$ and water ($H_2O$). The composition of the MOC generally includes at least one noble metal oxide supported on porous inorganic oxide support. More specifically, the chemical composition of the MOC may include: (i) noble metal oxides of platinum (Pt), palladium (Pd), silver (Ag), iridium (Ir), ruthenium (Ru), rhodium (Rh), osmium (Os) and gold (Au) and combinations thereof, (ii) some base metals (Ba, Cs, etc.), (iii) rare earth elements (Ce, Y, La, Nd, etc.), (iv) small quantities of other elements as dopant or promoters and (v) various porous inorganic oxides as supports (for example, aluminum oxide, titanium oxide, zirconium oxide, cobalt oxide, rare earth oxides, etc.) and mixtures thereof.

Catalytic activity and overall catalyst life of Pd— and other noble metal based MOCs is adversely affected by various chemical species present in the exhaust gas 28. For example, chemical species such as $SO_2$, P, Zn, Ca, Si, ash, among others, adversely affect the catalytic activity of the MOC in methane oxidation and its useful life for methane oxidation/emissions abatement. Therefore, these species act as catalyst poisons for the MOC. The source and the level of the catalyst poisons in the exhaust gas derived from natural gas engines depends on: (i) their level in the engine's fuel source, i.e. their levels in natural gas fuel or natural gas and diesel fuels, lubricating oil and (ii) on the fuel and lubrication oil consumption rates. Certain catalysts poisons (such as, for example, S) are present in the fuel or fuels 18, and other catalyst poisons (such as P, Zn, Ca, etc. in addition to S) are present in the lubricating oil. With respect to sulfur, the total sulfur level in LNG gas is generally very low (e.g., less than approximately 1 ppmv), and in CNG and pipeline NG the total sulfur level is generally less than approximately 5 ppmv. The sulfur level in the diesel pilot is approximately between 0.1 to 0.5% wt when conforming to the sulfur level regulations. The sulfur level in lubricating oils is in the range of from approximately 0.2% wt up to approximately 2% wt. Therefore, the main source of sulfur in exhaust gases, such as the exhaust gas 28, is from the fuel and the lubricating oil for CNG fueled engines, and the lubricating oil for LNG fueled engines.

To mitigate the effects of the catalyst poisons on the MOC, the exhaust gas emissions abatement system 14 includes a dual bed methane abatement unit 30 having a catalyst poison capturing guard bed 36, hereinafter "guard bed," positioned upstream of a MOC bed 40. In the illustrated embodiment, the guard bed 36 and the MOC bed 40 are housed in a single methane abatement unit. However, in certain embodiments, the guard bed 36 and the MOC bed 40 may be in separate housings. The guard bed 36 and MOC bed 40 are connected via appropriate hardware (such as for example, piping, valve, flanges) that directs and feeds the intermediate exhaust gas 42 from the guard bed 36 to the MOC bed 40. The guard bed 36 may be positioned on top or on the bottom of the MOC bed 40 in the methane abatement unit 30 depending on the direction of the flow direction of exhaust gas 28. For example, in embodiments in which the exhaust gas 28 flows in a direction from top to bottom of the methane abatement unit 30, the guard bed 36 is positioned above the MOC bed 40 such that the exhaust gas 28 flows through the guard bed 36 before flowing through the MOC bed 40. In embodiments in which the exhaust gas 28 flows in a direction from bottom to top of the methane abatement unit 30, the guard bed 36 is positioned below the MOC bed 40. In other embodiments, the guard bed 36 is horizontally positioned adjacent to the MOC bed 40. The methane abatement unit 30 may also be retrofitted into existing systems.

The guard bed 36 includes one or more layers of one or more MOC poisons capture components 46 that convert, capture, and remove the catalyst poison(s) from the exhaust gas 28 and, in the process, generate the intermediate exhaust gas 42 having substantially eliminated or significantly reduced amount of the catalytic poison(s) compared to the exhaust gas 28 (e.g., non-treated exhaust gas). In accordance with embodiments of the present disclosure, the guard bed 36 may remove between approximately 50% to approximately 100% of the catalyst poisons from the exhaust gas 28. For example, the guard bed 36 may remove 50%, 60%, 70%, 75%, 80%, 90%, or 100% of the catalyst poisons. The one or more layers and components 46 that may be used to capture and remove the catalyst poisons from the exhaust gas 28 include but are not limited to transition metal (e.g., manganese (Mn), vanadium (V), copper (Cu)) oxides supported on or co-mingled with various high (e.g., greater than approximately 0.2 cc/g) or low (e.g., less than approximately 0.2 cc/g) porosity inorganic oxides such as aluminum oxides, titanium oxide, cerium oxide and calcium or magnesium carbonates or oxides, or mixtures of oxides and carbonates materials. The one or more components 46 of the guard bed 36 may catalytically react with and convert at least a portion of the catalyst poisons in the exhaust gas 28 into more reactive species that react and are captured by other components of the guard bed 36 or tare converted into chemical species that do not have a significant deleterious effect on the MOC and its catalytic performance, thereby generating the intermediate exhaust gas 42. The intermediate exhaust gas 42 then exits the guard bed 36 and flows into the MOC bed 40 and where it is subjected to the MOC in the methane abatement unit 30. In certain embodiments, the one or more layers and components 46 of the guard bed 36 may chemically react with the catalyst poisons in the exhaust gas 28 to produce stable chemical species that remain on the surface of the guard bed 36. In another embodiment, the one or more components 46 of the guard bed 36 may physically adsorb the catalysts poisons in the exhaust gas 28, thereby trapping them in the guard bed 36. The intermediate exhaust gas 42 output from the guard bed 36 is fed to the MOC bed 40 where the $CH_4$ in the intermediate exhaust gas stream 42 is oxidized, i.e. converted to $CO_2$ and $H_2O$ to generate a treated exhaust gas 48 that has less than between approximately 150-500 ppmv of $CH_4$. In this way, the exhaust gas emission abatement system 14 disclosed herein generates a treated exhaust gas that may meet emission regulatory standards and be suitable for release from the system 10.

As discussed above, the guard bed 36 removes the catalyst poisons from the exhaust gas 28 to mitigate poisoning of the MOC in the MOC bed 40. The guard bed 36 may include a single layer of one or more components 46 or multi-layers of multi components 46. The single or multi components 46 in each layer convert or capture one or more catalyst poisons present in the exhaust gas.

Figure 2:
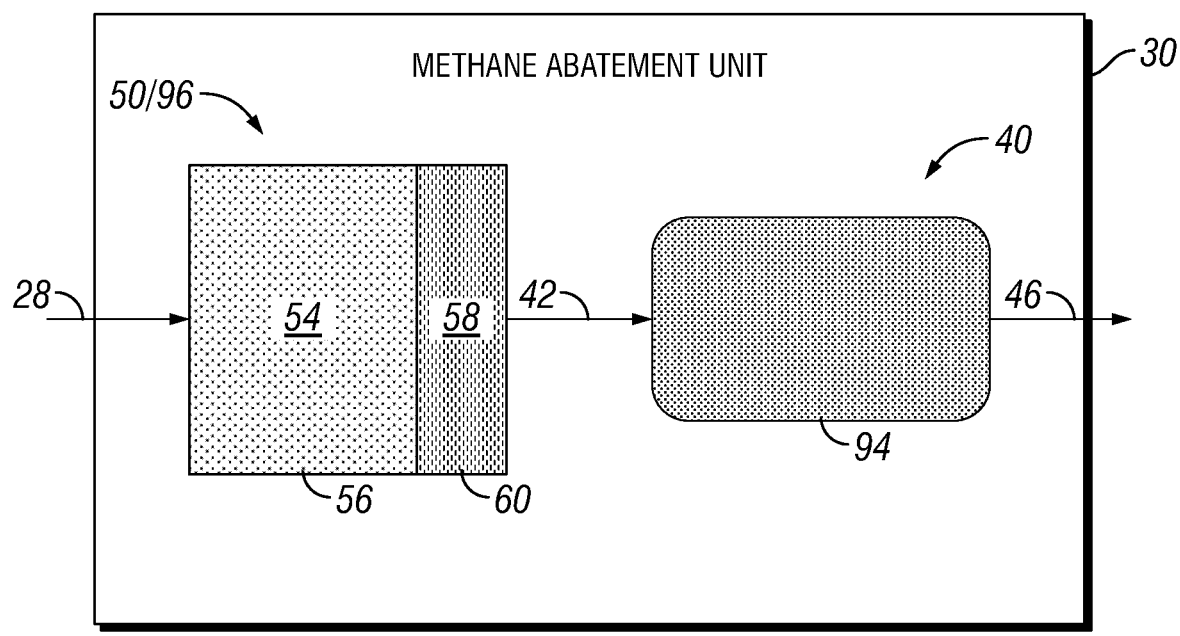
FIG. 2 is a block diagram of the dual bed methane abatement unit that may be used with the system of FIG. 1, the dual bed methane abatement unit includes a guard bed having the MOC poisons capturing component positioned upstream of a MOC bed, in accordance with an embodiment of the present disclosure.

FIG. 2 is a block diagram of the methane abatement unit 30 having a multi-layer guard bed 50 positioned upstream of the MOC bed 40, in accordance with an embodiment of the present disclosure. In the illustrated embodiment, the multi-layer guard bed 50 includes a first layer 54 having a first catalyst poisons conversion and/or capture component 56 (MOC poisons capture component) and a second layer 58 having a second catalyst poison conversion and/or capture component 60 (MOC poisons capture component) downstream of the first layer 54. The catalyst poisons conversion and/or capture components 56, 60 in each respective layer 54, 58 may include one or more chemical species (elements, metal hydroxides or oxides) that are selected and configured in such a way so as to convert and/or capture/trap and, at least in part, remove catalyst poisons from the exhaust gas 28. The layers 54, 58 are arranged in a sequential or stacked configuration. As should be noted, certain embodiments of the present disclosure include a single layer guard bed rather than the multi-layer guard bed 50. The single layer guard bed includes the component 56, the component 60, or a mixture of both.

As discussed above, the components 56, 60 remove the catalyst poisons from the exhaust gas 28. For example, the components 56, 60 may include chemical species that readily react with $SO_2$ to oxidize the $SO_2$ (in the presence of oxygen) in the exhaust gas, thereby forming $SO_3$. By converting $SO_2$ into $SO_3$, the sulfur species become more reactive with the surface of the components 56, 60. As such the ability/degree of utilization of the components 56, 60 for removal of the sulfur species from the exhaust gas (e.g., the exhaust gas 28) is improved compared to systems that do not include the components 56, 60. For example, the components 56, 60 facilitate the formation of a stable and inert metal sulfates, for example manganese sulfate ($MnSO_4$), aluminum sulfate ($Al_2(SO_4)_3$), calcium sulfate ($CaSO_4$), magnesium sulfate ($MgSO_4$), etc. These sulfates are stable and, once formed, they remain in the guard bed 50. Consequently, the active centers on the noble metal oxide phase, and more specifically, the oxygen vacancies within this phase of the MOC in the MOC bed 36 remain unaffected by sulfur species. Therefore, the oxygen vacancies within the noble metal oxide phase of the MOC are available to catalytically oxidize the $CH_4$ in the exhaust gas 28. In addition to chemical species that convert $SO_2$ into $SO_3$ and sulfates, the components 56, 60 include other chemical species that react or adsorb and/or form stable complexes with other catalyst poisons in exhaust gas 28 such as Zn, Ca, Mg, P, ash, among others. That is, the components 56, 60 react and convert or adsorb and essentially trap these other catalysts poisons within the guard bed 50 such that the catalyst poisons do not exit the guard bed 50 along with the intermediate exhaust gas 42.

In accordance with the present disclosure, catalyst poison capturing components that may be used to remove catalyst poisons in the exhaust gas (e.g., the exhaust gas 28) include, but are not limited to, transition metal (manganese (Mn), vanadium (V), copper (Cu)) and others) oxides, lime (CaO), calcium magnesium oxide ($CaMgO_2$), dolomite ($CaMg(CO_3)_2$)), or mixtures thereof, metal oxides (e.g., magnesium oxide (MgO), aluminum oxide ($Al_2O_3$)), and combinations thereof. Some of the transition metal oxide sites react with the $SO_2$ and the $O_2$ in the exhaust gas 28 to produce $SO_3$. The resultant $SO_3$ and residual $O_2$ also react with the remaining available transition metal oxide sites to produce the respective transition metal sulfates. In addition, the $SO_3$ may readily react with the porous inorganic oxide such as for example, aluminum oxide and or dolomite-derived material in the guard bed to form stable aluminum and calcium or calcium and/or magnesium sulfates. These stable sulfates are inert and remain within the layer 54, 58 and components 56, 60 of the guard bed 50. Therefore, in this way, sulfur species that are present in the exhaust gas 28 are converted into stable sulfates and are no longer able to exert an undesirable effect on the active centers on the noble metal oxide phase(s) of the MOC. As such, the active centers of the noble metal oxide phase(s) of the MOC remain fully available for methane oxidation during operation of the system 10.

High porosity materials such as $Al_2O_3$ and other inorganic oxide components of the guard bed 50 are also able to react with or adsorb, and essentially remove, other catalyst poisons present in exhaust gas, such as P, Zn, Ca, Mg, Si, ash, etc. that may not be removed by low porosity (water pore volume less than approximately 0.2 cubic centimeter/gram (cc/g)) materials such as dolomite-derived materials. The porous materials may react and bind or adsorb the aforementioned catalyst poisons, thereby trapping them in the guard bed and removing them from the exhaust gas. In certain embodiments, the component 56 in the first layer 54 of the guard bed 50 is a transition metal oxide or any other suitable metal oxide deposited on or co-mingled with a high porosity (water pore volume greater than approximately 0.2 cc/g) material such as $Al_2O_3$ and the component 60 in the second layer 58 of the guard bed 50 is a transition metal oxide or other suitable oxide? deposited on or co-mingled with relatively low porosity (water pore volume of less than approximately 0.2 cc/g) dolomite-derived material. The first layer 54 of the guard bed 50 may be a section that converts and/or traps a portion of the catalyst poisons in the exhaust gas 28 before the exhaust gas flows into the second layer 58 of the guard bed 50 for final trapping of the remaining poisons. For example, the first layer 54 may remove between approximately 5% and 90% or between 30 and 70% of the catalyst poisons in the exhaust gas 28. In certain embodiments, the first layer 54 may be selective for certain catalyst poisons and the second layer 58 towards other catalyst poisons. Specifically, the component 56 in the first layer 54 may be selective for oxidation of $SO_2$ to $SO_3$ and for certain elements and ash and the component 60 in the second layer 58 may complete the oxidation of $SO_2$ to $SO_3$ and be more selective for binding these sulfur species and forming sulfates. In accordance with an embodiment of the present disclosure, the components 56, 60 may include transition metal (e.g., Mn, V, Cu) oxides that are deposited on or co-mingled with the high porosity (water pore volume greater than approximately 0.2 cc/g) metal oxide and the relatively low porosity (water pore volume less than approximately 0.2 cc/g) dolomite-derived material. Furthermore, the level of transition metal in the respective components 56, 60 is between approximately 1% weight (% wt) and 25% wt and more specifically between approximately 5% wt and 15% wt.

Figure 3:
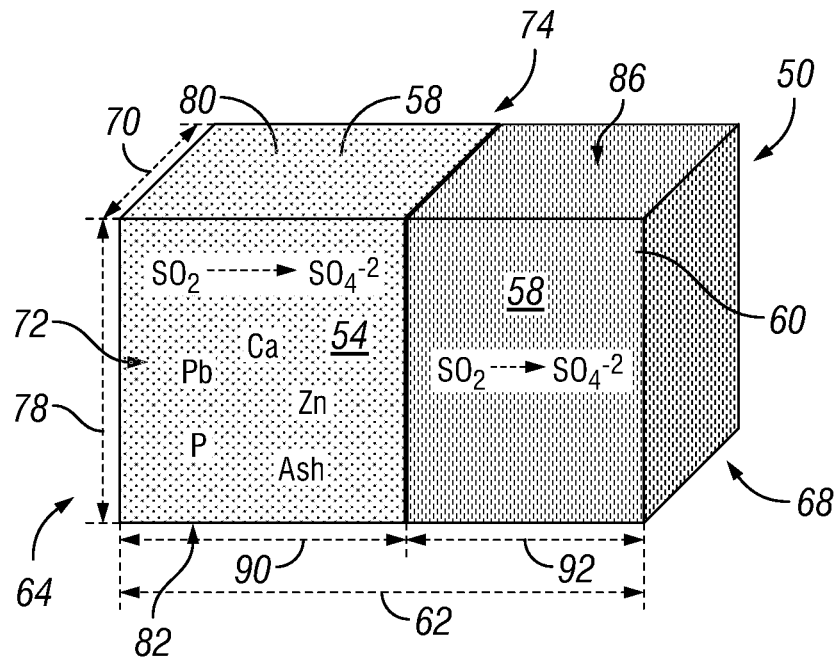
FIG. 3 is a block diagram of a multi-layer guard bed that may be used in the dual bed methane abatement unit of FIG. 2, whereby the multi-layer guard bed includes a first layer having a first MOC poisons capturing component and a second layer having a second MOC poisons capturing component, in accordance with an embodiment of the present disclosure.

FIG. 3 illustrates an embodiment of the multi-layer guard bed 50 that may be used to capture and remove catalyst poisons from the exhaust gas 28, in accordance with the present disclosure. As illustrated in FIG. 3 the multi-layer guard bed 50 has a total length 62 that extends from an upstream end 64 to a downstream end 68, a width 70 (i.e., thickness) that is substantially orthogonal to the length 62 and extends between a first side 72 and a second side 74 of the guard bed 36, and a height 78 that is substantially orthogonal to the length 62 and width 70 and extends between a top side 80 and a bottom side 82 of the multi-layer guard bed 50. The length 62, width 70, and height 78 define a volume 86 (e.g., total guard bed volume) of the multi-layer guard bed 50. While in the illustrated embodiment, the multi-layer guard bed 50 has a rectangular shape, the multi-bed guard bed 50 may have any other geometric shape (e.g., square, cylindrical, oval, etc.). As should be appreciated, the layers 54, 58 and components 56, 60 in the multi-layer guard bed 50 may be arranged in a fixed or a moving or movable bed configuration. The latter might allow for replacement or replenishment of layers 54, 58 saturated with poisons without interruption of the engine and exhaust gas emissions abatement system operation.

As illustrated in FIG. 3, the volume 86 is divided into the first layer 54 and the second layer 58. The volume 86 within the first layer 54 includes the first poisons capturing component 56 and the second layer 58 includes the second poisons capturing component 60. The first layer 54 extends along a first portion 90 of the length 62 such that the first layer 54 occupies between approximately 1% and approximately 99% of the total guard bed volume 86. Similarly, the second layer 58 extends along a second portion 92 of the length 62 such that the second layer 58 occupies between approximately 1% and approximately 99% of the volume 86. Dimensions of the portions 90, 92 may be the same or different. For example, the layers 54, 58 may be equally distributed along the length 62 of the multi-layer guard bed 50. As such, each portion 90, 92 of the respective layer 54, 58 is approximately 50% of the total length 62 of the multi-layer guard bed 50, and the respective poison capturing components 56, 60, occupy approximately 50% of the total guard bed volume 86. In other embodiments, the dimensions of the portion 90 of the first layer 54 may be more or less than the dimensions of the portion 92 of the second layer 58. Therefore, the first poisons capturing component 56 occupies more or less of the volume 86 compared to the second poisons capturing component 60. For example, the first poison capturing component 56 may occupy between approximately 1% and approximately 49% of the volume 86 and the second poison capturing component 60 may occupy between approximately 51% and approximately 99% of the volume 86, and vice versa.

In certain embodiments, the first poison capturing component 56 in the first layer 54 may partially oxidize the $SO_2$ to $SO_3$ and partially react and capture the $SO_3$ in the form of sulfates while at the same time react with, adsorb, capture, and remove the non-sulfur catalyst poisons. The second poisons capturing component 60 in the second layer 58 may primarily complete the oxidation and capture remaining unconverted $SO_3$ in the first layer 54 (i.e. removing the remaining sulfur poisons) while also capture and remove any remaining non-sulfur poisons that may have passed through the first layer 54. For example, in the embodiment illustrated in FIG. 3, the first poisons capturing component 56 is selected in such a way so that $SO_2$ is partially oxidized to $SO_3$ and captured in the form of sulfates. The layer 54 also largely reacts with, adsorbs or captures the non-sulfur catalyst poisons such as Zn, P, Ca, Mg, Si, ash and others. The second poisons capturing component 60 in the second guard bed layer 58 is selected in such a way so that to complete the conversion of any $SO_2$ that might have passed through the first bed 58 into $SO_3$ and to react and capture it (i.e. all remaining of sulfur poisons) as sulfates while simultaneously completing the capture of certain remaining non-sulfur poisons that might have passed through the first guard bed layer 54.

Therefore, to remove the sulfur and catalysts poisons in the manner discussed above, the first poisons capturing component 56 may include at least one transition metal oxide deposited on or co-mingled with at least one preferably high porosity (water pore volume greater than approximately 0.2 milliliters (mL)/gram (g)) inorganic oxide material such as, but not limited to, aluminum oxide ($Al_2O_3$), crystalline or amorphous aluminosilicate, titanium oxide, cobalt oxide, magnesium oxide, or any other suitable high porosity material or mixtures thereof that may react, convert, adsorb, or otherwise bind, the sulfur and non-sulfur catalyst poisons in the exhaust gas passing through the first layer 54. In this particular case, the transition metal oxide function provides for the oxidation of $SO_2$ to $SO_3$ and its partial capturing as sulfates, whereas the high porosity inorganic oxide material provides the necessary high surface area and chemical functionality needed to bind, adsorb and/or capture the sulfur and non-sulfur poisons. The second poisons capturing component 60 includes at least one transition metal oxide deposited on or co-mingled with relatively low porosity (water pore volume less than approximately 0.2 mL/g) but high sulfur uptake capacity material selected from but not limited to calcium oxide (lime), calcium magnesium oxide, calcium carbonate, calcium magnesium carbonate (dolomite) and mixtures thereof. For the second poisons capturing component 60, the transition metal oxide function also converts any remaining $SO_2$ in the exhaust gas to $SO_3$ and partially binds the $SO_3$ in the form of transition metal sulfates. The relatively low porosity (for example, dolomite-derived, <0.2 mL/g) material completes the capturing of $SO_3$ by forming sulfates while helping to complete the removal of the remaining non-sulfur poisons.

In one embodiment, the component 56, and/or the component 60, may be prepared by impregnating the high porosity (such as, for example, $Al_2O_3$) and low porosity (for example, dolomite-derived) inorganic materials with a suitable transition metal precursor to achieve a final transition metal concentration in the respective poisons capturing components 58, 60 of approximately 1% to 25%. More preferably, the impregnation could be carried out to achieve a transition metal concentration in the overall poisons capturing components 58, 60 of approximately 5 to 20% wt. By impregnating the high and low porosity materials of the components 56, 60 with the transition metal precursor, the efficiency of the poisons capturing components 56, 60 for oxidation and removal of $SO_2$ is increased compared to materials/components not impregnated with the transition metal precursor. In other embodiments, the transition metal precursor could be added during the stage of synthesis of the high or relatively low porosity materials in the component 56, 60) or co-mingled with the component 56, 60 during preparation via co-mulling (physical mixing), which may be followed by shaping of the component 56, 60. The transition metal (M) could be added in the above steps in the form of a transition metal precursor (such as for example $M_x(NO_3)_y$, $M_xCl_y$, etc.), transition metal hydroxide (M(OH)x) or transition metal oxide ($M_xO_y$). In all instances, the transition metal in the final poisons capturing components 56, 60 is in the form of a transition metal oxide.

Figure 4:
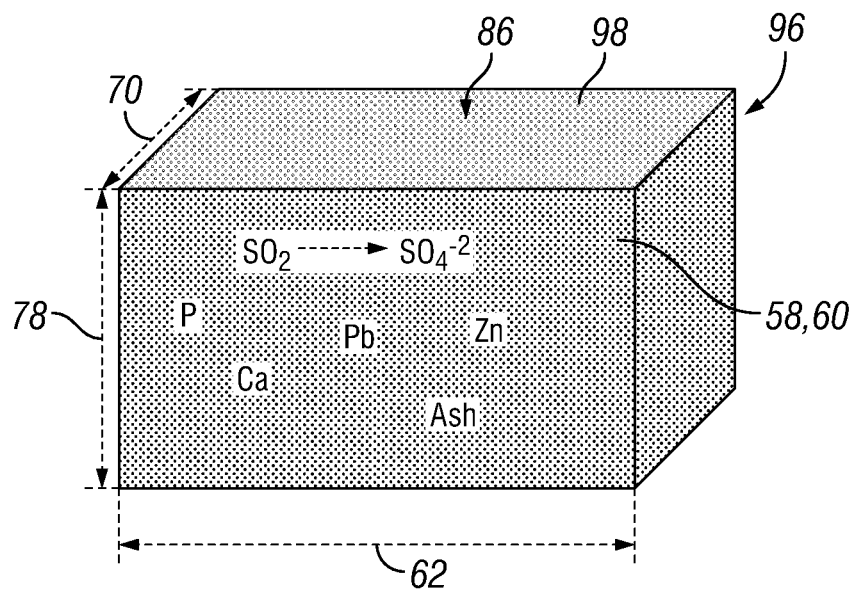
FIG. 4 is a block diagram of a single layer guard bed that includes at least one MOC poisons capturing component and may be used in the dual bed methane abatement unit of FIG. 2, in accordance with an embodiment of the present disclosure.

In certain embodiments, the volume 86 of the guard bed may be a single layer rather than a multi-layer, such as in the multi-layer guard bed 50. For example, the single-layer guard bed may include comprising a physical mixture of the first poisons capturing component 56 and the second poisons capturing component 60. For example, FIG. 4 illustrates an embodiment of a single-layer guard bed 96 that may be used in the methane abatement unit 30 to remove catalyst poisons from the exhaust gas 28. In the illustrated embodiment, the volume 86 of the single-layer guard bed 96 is uniformly packed with a capture material 98 that is a physical mixture of the poisons capturing components 56, 60. A ratio of the component 56, 60 in the capture material 98 may be 1:1, 1:2, 1:3, 1:4, 2:3, 2;1, 3:1, 4:1, 3:2 or any other suitable ratio. In certain embodiments, the mixture 98 includes individual pellets of the first poisons capturing component 56 and individual pellets of the second poisons capturing component 60. In other embodiments, the capture material 98 includes shaped particles (for example, pellets) of a capture component formed by co-extruding a physical mixture of both components 56, 60.

By incorporating the guard bed 50, 96 into the methane abatement unit 30, the catalytic performance in methane oxidation and useful life of the MOC may be significantly improved/extended. For example, returning to FIG. 2, in operation, the methane abatement unit 30 receives the exhaust gas 28 output by a natural gas engine (e.g., the natural gas engine 12). While in the methane abatement unit 30, the exhaust gas 28 flows into the guard bed 50, 96 and directly contacts the poisons capture components 56, 60, 98. The components 56, 60, 98 remove the catalyst poisons in the exhaust gas 28 by reacting, converting, adsorbing, or otherwise capturing the catalyst poisons, and in the process generating the intermediate exhaust gas 42. Following generation of the intermediate exhaust gas 42, the guard bed 50, 96 directs the intermediate exhaust gas 42 to the MOC bed 40, which includes a methane oxidation catalyst (MOC) 94.

As discussed above, the MOC 94 may be any noble metal oxide catalyst. For example, the MOC 94 may be PdO-based catalyst on an inorganic oxide (e.g., zirconium oxide) containing support. In the MOC bed 40, the intermediate exhaust gas 42 directly contacts the MOC 94. The MOC 94 includes at least one active noble metal oxide phase that reacts with $CH_4$ in the intermediate exhaust gas 42 and oxidizes $CH_4$ due, in part, to the presence of oxygen in the exhaust gas to form $CO_2$ and $H_2O$. Because the guard bed 50, 96 removes the catalyst poisons from the exhaust gas 28, the active noble metal oxide phase of the MOC 94 is not adversely affected by the poisons and is, therefore, fully available to oxidize/abate the $CH_4$ in the intermediate gas 42. The above enables the MOC 94 to fully exert its methane oxidation activity and to sustain it for a significantly long period of time (e.g., tens of thousands of hours on stream) compared to MOC that are not positioned downstream of the guard bed 50, 96. As such, the $CH_4$ levels in the treated exhaust gas 48 generated by the methane abatement unit 30 may be approximately 150-200 ppmv. $CH_4$ levels of approximately 150-200 ppmv are at or below permissible $CH_4$ emission levels.

EXAMPLES

Set forth below are experiments illustrating the performance of the guard bed disclosed herein. Each of the experiments below were generally run using various powder guard bed formulations that were intentionally poisoned with $SO_2$ or aged positioned upstream of a MOC bed. The MOC formulation used throughout the experiments was as follows: (Pd (4% wt) Pt (0.5% wt) Rh (0.125% wt) on a zirconium ($ZrO_2$) support. Each powder guard bed was prepared using any suitable technique known in the art to yield a desired chemical composition, as shown in Table 1. For a reference, performance tests for the MOC were carried out without a guard bed (EXAMPLES 1 and 15).

The experiments were run in a high throughput powder catalyst testing unit. Each reactor of the high throughput powder catalyst testing unit was loaded such that a ratio of loaded guard bed/MOC was 50/50 vol %. The ability of the powder guard bed to remove catalyst poisons was evaluated in each respective powder guard bed/MOC sample by comparing the performance (or ability) of the MOC positioned downstream of each respective powder guard bed to oxidize or convert methane present in a model (e.g., mimicking) exhaust gas feed composition. To compare the catalytic activity of the various powder guard beds/MOC samples a temperature requirement for 50% methane conversion ($T50_{CH4}$) obtained during the performance test was determined (See Table 1). In all instances, except for EXAMPLE 1, the performance tests were run in 2 stages. In the first stage (EXAMPLES 2-17), the powder guard bed/MOC samples were placed in a high throughput $SO_2$ aging test rig and subjected to $SO_2$ aging for a duration of 24 hrs using gas feed containing 5 parts per million (ppm) $SO_2$, 500 ppm $CH_4$, and 10% vol $H_2O$, 10,000 $h^{-1}$ Gas Hourly Space Velocity (GHSV) calculated by dividing volumetric gas flow in L/hr by the volume of catalyst in L, and an inlet gas temperature of 470° C. Following the $SO_2$ aging, the powder guard bed/MOC samples were removed from the $SO_2$ test rig, and reloaded into a "clean" high throughput test rig and tested using exhaust gas mimicking feed containing 2000 ppm $CH_4$, 1000 ppm CO, 7.5% vol. $CO_2$, 6% vol. $O_2$, 150 ppm NO, and 15% $H_2O$. As used herein, a "clean" high throughput test rig is intended to denote a high throughput test rig that is devoid of sulfur. In the second stage of testing, the performance tests were run without the addition of $SO_2$ to the gas feed. The powder guard bed/MOC sample of EXAMPLE 1 was not subjected to $SO_2$ aging but rather subjected directly to the second (clean, devoid of $SO_2$ in feed) stage of testing.

TABLE 1

Methane Oxidation Activity ($T50_{CH4}$) for MOC*

| EXAMPLE# | GUARD BED COMPOSITION | $T50_{CH4}$ (° C.) | $SO_2$-AGED |
|---|---|---|---|
| 1 | NONE | 391 | NO |
| 2 | Mn(4)/$CaMgO_2$—$Al_2O_3$ | 392 | YES |
| 3 | Cu(10)/$CaMgO_2$ | 394 | YES |
| 4 | $CaMgO_2$ | 394 | YES |
| 5 | Ce(2)Cu(4)/$CaMgO_2$ | 395 | YES |
| 6 | CaO | 395 | YES |
| 7 | Ce(2)Cu(4)/$CaMg(CO_3)_{2Yes}$ | 396 | YES |
| 8 | K(8)MgO—$Al_2O_3$ | 397 | YES |
| 9 | $CaMgO_2$—$Al_2O_3$ | 398 | YES |
| 10 | Ca(10)/$Al_2O_3$ | 401 | YES |
| 11 | Ce(2)Cu(4)/MgO-$Al_2O_3$ | 407 | YES |
| 12 | CuO/ZnO/$Al_2O_3$ | 415 | YES |
| 13 | Mn(6)/$Al_2O_3$ | 428 | YES |
| 14 | MgO—$Al_2O_3$ | 442 | YES |
| 15 | NONE | 458 | YES |
| 16 | $Al_2O_3$ | 462 | YES |
| 17 | Ni/$Al_2O_3$ | 462 | YES |

*The numbers in parentheses represent the % wt concentration of the respective element in the final guard bed formulation Analysis of the data in Table 1 indicates that, following $SO_2$ aging, the powder guard bed/MOC samples containing calcium-magnesium (i.e., dolomite)-derived and calcium oxide (lime)-based guard bed formulations (e.g., EXAMPLES. 2-6) exhibited the lowest $T50_{CH4}$ values (392-395° C.). The $T50_{CH4}$ values observed in EXAMPLES 2-6 are at desired levels indicating that the dolomite-derived and lime-based guard bed formulations have the best methane oxidation activity compared to the other powder guard bed/MOC combinations tested. Furthermore, certain $SO_2$ aged powder guard bed/MOC samples from EXAMPLES 2-6 provided very similar catalytic activity (i.e. $T50_{CH4}$ values) to the reference/control MOC that was not subjected to $SO_2$ aging ($T50_{CH4}$=391° C.). It should be noted that, the MOC sample which was subjected to $SO_2$ aging without the guard bed (EXAMPLE 15) exhibited significantly lower methane oxidation activity as evidenced by its $T50_{CH4}$ value of 458° C., which is 67° C. higher than the MOC that was not subjected to $SO_2$ aging (EXAMPLE 1). Therefore, as determined from the data in Table 1, powder guard beds having calcium magnesium or calcium formulations effectively remove the $SO_2$ MOC catalyst poison that, otherwise, would have adversely affected and significantly decreased the catalytic activity and activity stability of the MOC. It should be noted that, the guard bed formulation having a transition metal oxide deposited on a support containing calcium and magnesium oxide (e.g., $CaMgO_2$) along with $Al_2O_3$ (e.g., EXAMPLE 2), afforded the best $SO_2$ capturing performance compared to the other powder guard bed/MOC samples tested. This is evidenced by the lowest $T50_{CH4}$ value (392° C.), i.e. highest methane oxidation activity exhibited by this guard bed formulation (EXAMPLE 2) relative to all $SO_2$ aged powder guard bed/MOC samples tested. Notably, the specific transition metal oxide and $CaMgO_2$ and $Al_2O_3$ powder guard bed formulation of Example 2 afforded, following the $SO_2$ aging, essentially the same $T50_{CH4}$ value, i.e. methane oxidation activity, as the reference MOC sample (EXAMPLE 1) which was not aged with $SO_2$ and tested in the absence of a guard bed (the most active sample, $T50_{CH4}$=391° C.).

The transition metal (Mn or Cu) oxide in the guard bed formulation, when in the presence of oxygen, provides for rapid oxidation of $SO_2$ to $SO_3$. The calcium magnesium-based support in the guard bed formulation primarily reacts with and captures the $SO_3$ in the form of sulfates, whereas the $Al_2O_3$ primarily provides higher surface area and chemical functionality that is beneficial for adsorbing, reacting or capturing some of the other non-sulfur poisons that might be present in the exhaust gas. In addition, the $Al_2O_3$ could also contribute, at least in part, to further removal of the sulfur containing poisons by reacting and converting them to aluminum sulfates. Examples 2-6 and their respective data clearly illustrate the beneficial effect of having the transition metal oxide, calcium, magnesium, and alumina in guard bed formulation disclosed herein upstream of the MOC bed. For example, the disclosed transition metal oxide, calcium, magnesium, and alumina guard bed formulation is effective in removing the S containing catalyst poisons from exhaust gas derived from natural gas burning engines thus allowing the MOC catalyst placed downstream of it to fully exert and maintain its methane oxidation activity and performance stability. Accordingly, the transition metal oxide, calcium, magnesium, and alumina guard bed formulations of the present disclosure are suitable for use in methane emissions abatement system to abate unburned methane from natural gas fueled engines in a stationary and a transport service.

Dual-Layer Guard Bed

As discussed above, the guard bed of the present disclosure may have multiple layers of different guard bed formulations. A dual-layer guard bed formulation was prepared and tested for removal of sulfur and other catalysts poisons (EXAMPLE 18). The first layer of the dual-layer guard bed includes a transition metal oxide and $Al_2O_3$ component. The second layer of the dual-layer guard bed includes a transition metal oxide and calcium magnesium carbonate (dolomite)-derived component. These two layers and components are arranged in a stacked configuration (one after another) and positioned upstream of the MOC bed.

Preparation of the First Layer-$Al_2O_3$ Component of the Guard Bed:

The first layer of the dual-layer guard bed may be prepared by impregnating shaped (extruded) alumina aggregates (e.g., alumina pellets) with an aqueous solution of a transition metal precursor. The transition metal precursor may be added to an alumina aggregate formulation prior to or after extrusion. For example, the transition metal precursor may be added to an extrusion mix used to prepare the alumina pellets. The extrusion mix is prepared by mixing alumina (or aluminum hydroxide) powder and a peptizing agent. Alternatively, an aqueous solution of the transition metal precursor may be added to prepared alumina pellets (e.g., extrudate) via any one of the impregnation methods know in the art. For example, the alumina pellets may be impregnated via pore volume impregnation or by circulating impregnation solution. The alumina pellets may be any suitable geometric shape. By way of non-limiting example, the alumina pellets maybe cylindrical, polylobal (e.g., tri-lobed), spheres, rings, or tablets. Dimensions of the alumina pellets range from between approximately 1.2 and 10 mm in diameter and approximately 4 and 10 mm in length.

The $Al_2O_3$ component/support used in EXAMPLE 18 was prepared according to the method described in U.S. Pat. No. 4,579,729. Briefly, an extrusion mix (for the support) was prepared by placing 654 g of wide pore alumina powder (LOI=23.5% w) in muller mixer bowl and, while running the muller mixer bowl, a solution of nitric acid peptizing agent was added, thereby forming an alumina/peptizing agent solution mix. The alumina/peptizing agent solution mix was mulled in the muller for approximately 15 minutes to allow the peptizing agent to react with the wide pore alumina powder. Alternatively, an inorganic hydroxide sol (.g., aluminum hydroxide sol) binder may be mixed with the wide pore alumina powder for between approximately 10 to 30 mins to allow for a peptization or binding of the wide pore alumina powder. Extrusion aids, such as for example, citric acid, Superfloc, and/or Methocell, among others, may also be added to the alumina/peptizing agent solution mix to improve the ease of the extrusion and partially, when needed, to generate additional porosity.

Following addition of one or more extrusion aids, approximately 130 g of DI water was added to the muller and the muller was restarted. Once addition of the DI water was completed, the extrusion mix was mulled for approximately 15 minutes, transferred to a stainless-steel tray, and extruded using a die plate into trilobe (TL) pellet strands having a diameter of approximately 2.5 mm. The TL pellet strands were collected, transferred to a drying convection oven, and dried at 120° C. overnight. Once dry, the TL pellet strands were crushed and sieved to yield TL pellets of approximately 4 to 6 mm in length. The dried and sized TL pellet strands were calcined in 40 L/hr of a dry air flow at a heating rate of 2° C./min to 600° C. and held at 600° C. for 6 hrs.

Following calcination, the TL pellet strands were impregnated using the pore volume impregnation method to target a 10% concentration of Mn on the TL pellet strands. The impregnation solution was prepared by dissolving approximately 6460 g of $Mn(NO_3)_2 \cdot 4.85H_2O$ with 6914 mL of DI water to yield a manganese nitrate $(Mn(NO_3)_2 \cdot 4H_2O)$ solution having between approximately 25 wt. % and approximately 75 wt. % $Mn(NO_3)_2$. The volume of the prepared impregnation solution was then topped with additional DI water to adjust total volume needed to satisfy the pore volume of the extrudate quantity to be impregnated (8680 mL). For example, in the pore volume impregnation method, the volume of the impregnation solution used is substantially the same as the pore volume TL pellet strands. In this particular example, the total water pore volume of the $Al_2O_3$ TL pellet strands was 0.868 mL/g. Therefore, the volume of the $Mn(NO_3)_2$ impregnation solution was adjusted to 8680 mL and used to impregnate 10 kg of the $Al_2O_3$ TL pellet strands in a rotating impregnation vessel. While rotating the impregnation vessel, a portion of the $Mn(NO_3)_2$ impregnating solution was added in a small stream-like mode to the TL pellet strands in the vessel. The TL pellet strands and the $Mn(NO_3)_2$ impregnation solution were allowed to homogenize for few minutes. Following homogenization of the TL pellet strands and the portion of the $Mn(NO_3)_2$ impregnation solution the remaining portion of the $Mn(NO_3)_2$ impregnation solution was slowly added to the rotating impregnation vessel, thereby forming the impregnated pellets.

The impregnated pellets were allowed to tumble in the rotating impregnator for approximately 10 minutes, after which the impregnated pellets were transferred into trays and allowed to air dry overnight followed by drying in a 40 L/hr flow of dry air at 120° C. for 12 hrs. The dried impregnated pellets were calcined using a heating rate of 2° C./min to 600° C. and holding at 600° C. for 6 hrs.

Preparation of the Second Layer-Second Component of the Guard Bed:

The second layer of the dual-layer guard bed may be prepared in a manner similar to the first layer. As discussed above, the second layer is positioned downstream of the first layer in the dual-layer guard bed. The second layer includes a transition metal oxide and dolomite-derived component prepared by mixing 25 kg of dolomite $(CaMg(CO_3)_2)$ powder particles having an average particle size of between approximately 5 microns (µm) and approximately 15 µm and 6476.5 g of LUDOX AS-40 silica sol binder having 40% wt silica solids content in a mix muller to form an extrusion mix. The LUDOX AS-40 silica sol was used as a binder to bind individual dolomite powder particles together and to help shape the dolomite particles into shaped aggregates (e.g., pellets, spheres, rings, tablets, etc.) of the desired diameter via extrusion.

The extrusion mix was mulled in the mix muller for approximately 10 minutes. While in the mix muller, approximately 294 g of Methocel was added to the extrusion mix at approximately 2 minutes, followed by approximately 126.5 g of Superfloc at approximately 6 minutes of from the start of mulling. The extrusion mix was mulled for an additional 10 minutes and the resultant mixture was extruded into 2.5 mm diameter TL extrudate strands. The TL extrudate strands were air dried at ambient temperature overnight and subsequently dried in a convection drying oven overnight at 100° C. The dried TL extrudate strands were crushed to form pellets having a length of between approximately 4 mm to approximately 8 mm and calcined in a 40 L/hr flow of dry air using 2° C./min heating rate to and holding at 600° C. for 6 hrs, thereby forming a calcined dolomite-derived TL extrudate. The calcined dolomite-derived TL extrudate was subjected to impregnation with a transition metal precursor to form a Mn-impregnated dolomite-derived TL pellets (e.g., the second component) of the dual-layer guard bed. The calcined dolomite-derived TL extrudate was impregnated using the $Mn(NO_3)_2$ impregnation solution discussed above with reference to the $Al_2O_3$ component of the first layer of the dual-layer guard bed. The targeted final concentration of Mn on the dolomite-derived component was 8% wt. The Mn-impregnated dolomite-derived TL pellets were air-dried overnight followed by drying in a convection oven at approximately 120° C. for at least 2 hrs. Following drying, the impregnated dolomite-derived TL pellets were subjected to a dry air flow of 40 L/hr, heated at a 2° C./min ramp rate and calcined at 600° C. for approximately 6 hrs.

Example 19—Dual-Layer Guard Bed

To illustrate the ability of the aforementioned dual-layer guard bed of EXAMPLE 18 to capture sulfur containing and other catalyst poisons from an exhaust gas generated by and output from an engine operated with a LNG as a fuel, the dual-layer guard bed was positioned upstream of a MOC bed and the $CH_4$ abatement activity of the MOC in the MOC bed was evaluated. For example, the methane conversion measured during this test was used as a measure of the effectiveness of the guard bed to capture the poisons in exhaust gas. The test was done using a 12 L six cylinder LNG fueled, spark ignited engine operating under lean fuel regime. The test was done at a GHSV of approximately 50,000 $h^{-1}$. The fuel used to operate the natural gas engine was LNG having approximately 98% volume (% vol) $CH_4$, 2% vol $C_2$+, and S less than 0.1 ppm. A composition of the exhaust gas generated by the natural gas engine was 1600 ppmv $CH_4$, 450 ppm CO, 7.3% vol $CO_2$, 8.4% vol $O_2$, 140 ppmv NO, 12.5% vol $H_2O$, and 0.15 ppm $SO_2$, and a temperature of the exhaust gas existing the natural gas engine was approximately 470° C. The dual-layer guard bed was loaded with a first (upstream) layer of 1.03 kg of 10% $Mn/Al_2O_3$ 2.5 mm diameter TL pellets (EXAMPLE 18) and 3.6 kg of 8% w Mn/dolomite 2.5 mm TL pellets (EXAMPLE 18). The MOC was prepared by washcoating of a slurry containing the MOC catalyst components on a 4.16" in diameter by 3.5" long ceramic monolith substrate with 400 cpsi (pore channels per square inch). The composition of the washcoated MOC catalyst was 4% wt Pd, 0.5% wt Pt, 0.125% wt Rh on $ZrO_2$.

Figure 5:
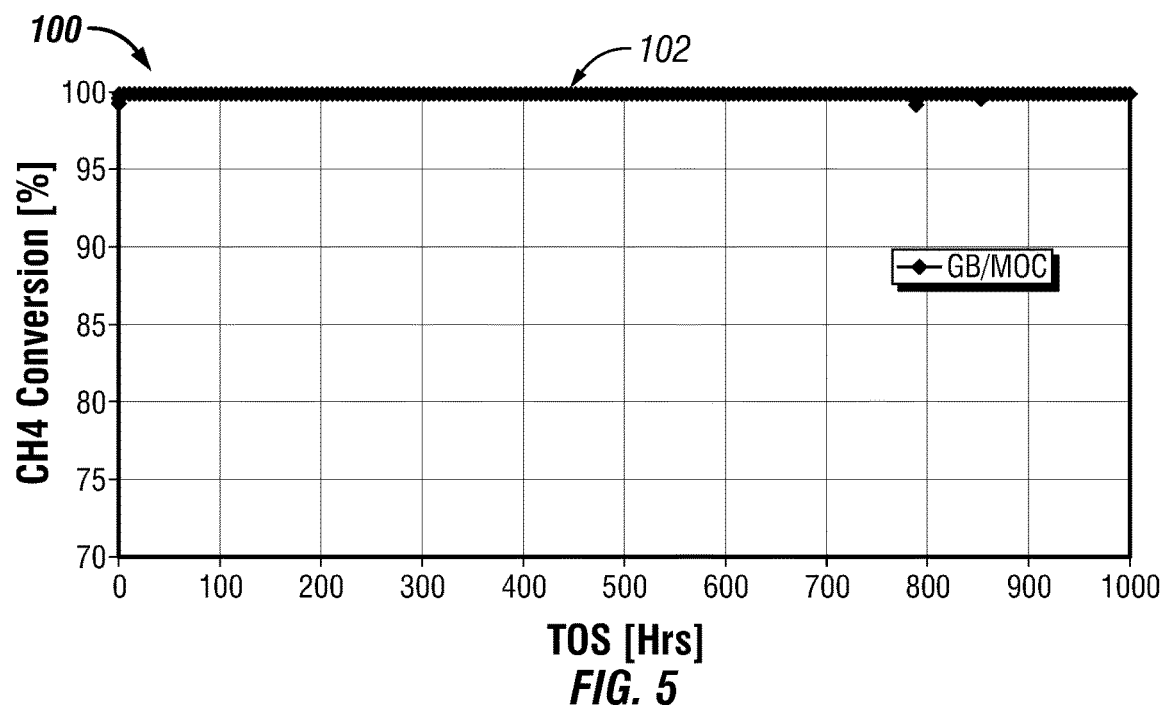
FIG. 5 is an exemplary plot of percent $CH_4$ conversion as a function of time on stream (TOS) for the guard bed (GB) and MOC system of FIG. 1, in accordance with an embodiment of the present disclosure.

The results of the above described test of the dual-layer guard bed formulation of Example 18 is shown in FIG. 5. FIG. 5 is a plot 100 of percent $CH_4$ conversion as a function of time in hours. As shown, the data 102 clearly indicates that the dual-layer guard bed/MOC system of the present disclosure maintained 100% $CH_4$ conversion for the duration of the test. As such, the dual layer guard bed formulation of EXAMPLE 18 used for this test effectively converted, adsorbed, or captured the S and other poisons present in the engine exhaust gas thus allowing the PdO-based MOC to fully exert methane oxidation/abatement activity for the duration of the test.

Figure 6:
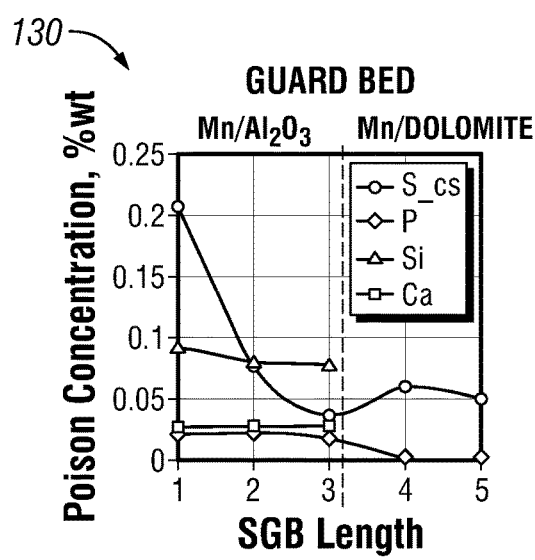
FIG. 6 is an exemplary plot of MOC catalyst poisons concentration distribution profiles as a function of guard bed length, in accordance with an embodiment of the present disclosure.
Figure 7:
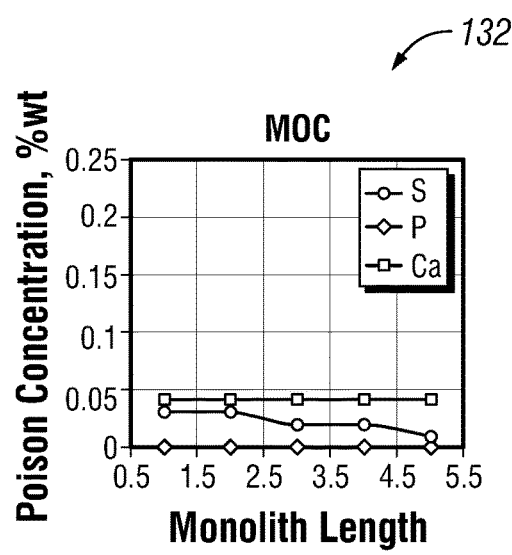
FIG. 7 is an exemplary plot of MOC catalyst poisons concentrations distribution profiles as a function of MOC monolith length, in accordance with an embodiment of the present disclosure.

FIGS. 6 and 7 are plots 130 and 132 showing the catalyst poisons distribution profiles/concentrations in percent weight (% wt) as a function of guard bed length and the MOC bed length, respectively. The poisons distribution profiles shown in FIGS. 6 and 7 were obtained by chemical composition analysis of spent guard bed and MOC monolith samples taken from the engine test described above using inductively coupled plasma (ICP) techniques. The spent guard bed and MOC monolith samples were taken from different sections along a length of the respective guard bed layers (FIG. 6) and the MOC monolith (FIG. 7). As discussed above, the dual-layer guard bed and the MOC bed were subjected to the exhaust gas stream for a duration of 1000 hrs. Therefore, the dual-layer guard bed formulation and the MOC in the MOC bed were exposed to the catalyst poisons that originated from the LNG fuel and the lubricating oil used for operation of the natural gas engine. As shown in FIG. 6, the $Mn/Al_2O_3$ component in the first guard bed layer effectively captured and reduced the concentrations of sulfur (S), silicon (Si), and phosphorus (P) catalyst poisons in the exhaust gas, whereas the Mn/dolomite-derived component of the second guard bed layer captured and reduced remaining concentrations of S and P in the exhaust gas. It should be noted that the Si concentration in the second guard bed layer was not determined because the dolomite-derived pellets were extruded with silica sol as a binder. Therefore, the Si concentration in the second guard bed layer would not be representative of the amount of Si removed from the exhaust gas by the second guard bed layer. Zn is not detected along the dual-layer guard bed length because the amount of Zn is relatively small (under detection limit) as it's distributed on a large surface area of the guard bed.

As shown in FIG. 7, the concentrations of catalyst poisons along the length of the MOC monolith bed is very low (<0.05% wt.). Specifically, the data shows that the concentration of the S was as low as 0.025% wt and decreased along the length of the MOC to about 0.01% wt. In addition, the level of P on the spent MOC was below detectable levels across the length of the MOC bed. The concentration of Si was not determined due to the presence of silica in the MOC monolithic support material. The above catalyst poisons profiles and catalyst performance data demonstrate that the dual-layer guard bed disclosed herein effectively remove the S and non-S containing MOC poisons from the exhaust gas. Consequently, the MOC catalyst may fully exert $CH_4$ oxidation/conversion and $CH_4$ emissions abatement activity compared to systems that do not include the disclosed guard bed (see FIGS. 8 and 9).

Single-Layer Guard Bed

In addition to the dual-layer guard bed tests, the $CH_4$ conversion activity of the MOC was also tested using a single-layer guard bed. The layer of the single-layer guard bed includes a single component such as, for example, transition metal $(M)/Al_2O_3$ or M/dolomite-derived material. However, in certain embodiments, the layer of the single-layer guard bed includes a physical mixture of two or more components, as discussed in further detail below. The single component of the single-layer guard bed may be prepared by physically mixing $Al_2O_3$ and Mn/dolomite powder particles of appropriate size, adding a peptizing agent or a binder to prepare an extrusion or shaping mix having the desired shaping consistency, and extruding or otherwise shaping the mix of these particles to produce homogeneously intermixed $Al_2O_3$ and dolomite-derived aggregates (e.g., pellets, tablets, spheres, or rings). In this particular embodiment, the $Al_2O_3$ and dolomite-derived particles are chemically bound. The transition metal M (for example, Mn) addition could be accomplished either via transition metal precursor addition during the extrusion mix preparation or during the mix pre-shaping stage. In other embodiments, the transition metal M may be incorporated into the $Al_2O_3$ and dolomite-derived aggregates via impregnation with a transition metal precursor. In all cases, the extrusion mix have to be peptized with a carefully selected peptizing agent or it will need to be subjected to a binder addition.

The addition of additives, such as the peptizing agent or binder, to the shaping mix provide for proper binding of the particles and to ensure sufficient structural integrity of the calcined pellets, tablets, rings or spheres. The peptizing agents modify the surface of the particles (e.g., $Al_2O_3$ or the dolomite-derived material), by making them more reactive, which facilitates binding of the particles with the surface of other particles. Certain peptizing agents may be large or bulky enough (e.g., of a large molecule size, such as citric acid—$C_6H_8O_7$) to improve not only the surface reactivity (i.e., susceptibility for binding) of the particles, but also to increase the final pore size and porosity of the calcined aggregates. The increase in pore size may be substantial compared to particles treated with peptizing agents of a smaller size (e.g., nitric acid $HNO_3$). These increased pore size or total porosity of the shaped and calcined aggregates of the single component may provide for better access to their surface by catalyst poisons and react with and or allow for the accommodation of larger amounts of catalyst poisons. By way of non-limiting example, the peptizing agents include nitric acid, acetic acid, citric acid, or any other suitable peptizing agent. In addition to the peptizing agents, other extrusion aids (such as Methocel, Superfloc, etc.) may be added to the shaping or extrusion mix to improve the shaping process. These could also impart additional pore size modifications and total porosity increase.

In other embodiments, the layer of the single-layer guard bed is a physical mixture of two components. For example, the layer may be a physical mixture of $M/Al_2O_3$ and M/dolomite-derived components, such as those discussed above with respect to Example 18. The physical mixture may be generated by mixing pre-shaped $Al_2O_3$ particles (as pellets, tablets, rings or spheres) with pre-shaped dolomite-derived particles (as pellets, tablets, rings or spheres). In certain embodiments, the pre-shaped $Al_2O_3$ and dolomite-derived particles are mixed prior to impregnating with the M precursor. In other embodiments, the pre-shaped $Al_2O_3$ and dolomite-derived particles are mixed after impregnating with the M precursor. In the physical mixture of the $Al_2O_3$ and dolomite-derived particles, there is no chemical bonding between the $Al_2O_3$— and dolomite-derived components.

Examples 20 and 21—Single-Layer Guard Bed

The single component used in EXAMPLES 20 and 21 were prepared by adding 654 g of wide pore alumina (LOI=23.5% w) to a muller mixer bowl, starting the muller, and adding a solution of nitric acid (EXAMPLE 20) or acetic acid (EXAMPLE 21) peptizing agent to the muller. The respective peptizing agent solutions were prepared by adding 10.8 g of 69.4% wt. nitric acid to 687 g of DI water or adding 10.8 g of glacial (100%) acetic acid to 724 g of (DI) water. The alumina/peptizing agent solution mix was mulled for 15 minutes to allow the peptizing agent to react with the alumina powder. Following peptizing of the alumina powder, the muller was stopped, a mixture of 500 g of dolomite, 10 g Superfloc, 6 g Methocell and 130 g of 40% wt solids Ludox AS-40 silica sol binder (EXAMPLE 20) or 130 g of DI water (EXAMPLE 21) was added to the muller and the muller was restarted. The resultant 50% wt $Al_2O_3$ 50% wt dolomite extrusion mix was mulled for 15 minutes after which it was extruded into 2.5 mm in diameter long $Al_2O_3$-dolomite TL pellet strands using a die plate. The $Al_2O_3$-dolomite TL pellet stands were dried in a convection oven at 120° C. overnight. After drying, the $Al_2O_3$-dolomite TL pellet strands were crushed and sieved to size to $Al_2O_3$-dolomite TL pellet strands of approximately 4-6 mm in length. The sized $Al_2O_3$-dolomite TL pellet strands were subjected to calcination in a 40 L/hr of a dry air flow using a heating rate of 2° C./min to 600° C. and holding at 600° C. for 6 hrs.

Following calcination, the $Al_2O_3$-dolomite TL pellet strands were impregnated via the pore volume impregnation method discussed above with reference to EXAMPLE 18. Briefly, the total water pore volume for calcined $Al_2O_3$-dolomite TL pellet strands in Example 20 (nitric acid peptizing solution) and in EXAMPLE 21 (acetic acid peptizing solution) was 0.50 mL/g and 0.55 mL/g, respectively. For impregnation of the $Al_2O_3$-dolomite TL pellets in EXAMPLE 21, a transition metal impregnation solution was prepared by dissolving 397.3 g of $Mn(NO_3)_2 \cdot 4H_2O$ with 60-70% total DI water (330 mL) needed to saturate the total pore volume of the amount of extrudate to be impregnated. The volume of the impregnation solution was adjusted with additional DI water to achieve the total volume needed to satisfy the pore volume of the extrudate quantity to be impregnated (550 mL). Approximately 1 kg of the calcined $Al_2O_3$-dolomite TL pellets from EXAMPLE 21 was placed into a rotating impregnation vessel. While rotating the vessel, approximately half of the $Mn(NO_3)_2$ impregnating solution was added in a small stream like mode to the $Al_2O_3$-dolomite TL pellets. After allowing the mixture to homogenize, the remaining portion of the impregnation solution was added slowly to the rotating extrudate. Following addition of the impregnation solution, the impregnated pellets were tumbled in the rotating impregnation vessel for approximately 10 minutes. The resultant wet impregnated $Al_2O_3$-dolomite TL pellets were air dry overnight followed by drying in a 40 L/hr flow of dry air at 120° C. for 12 hrs and calcined using heating rate of 2° C./min to 600° C. and by holding at 600° C. for 6 hrs.

Figure 8:
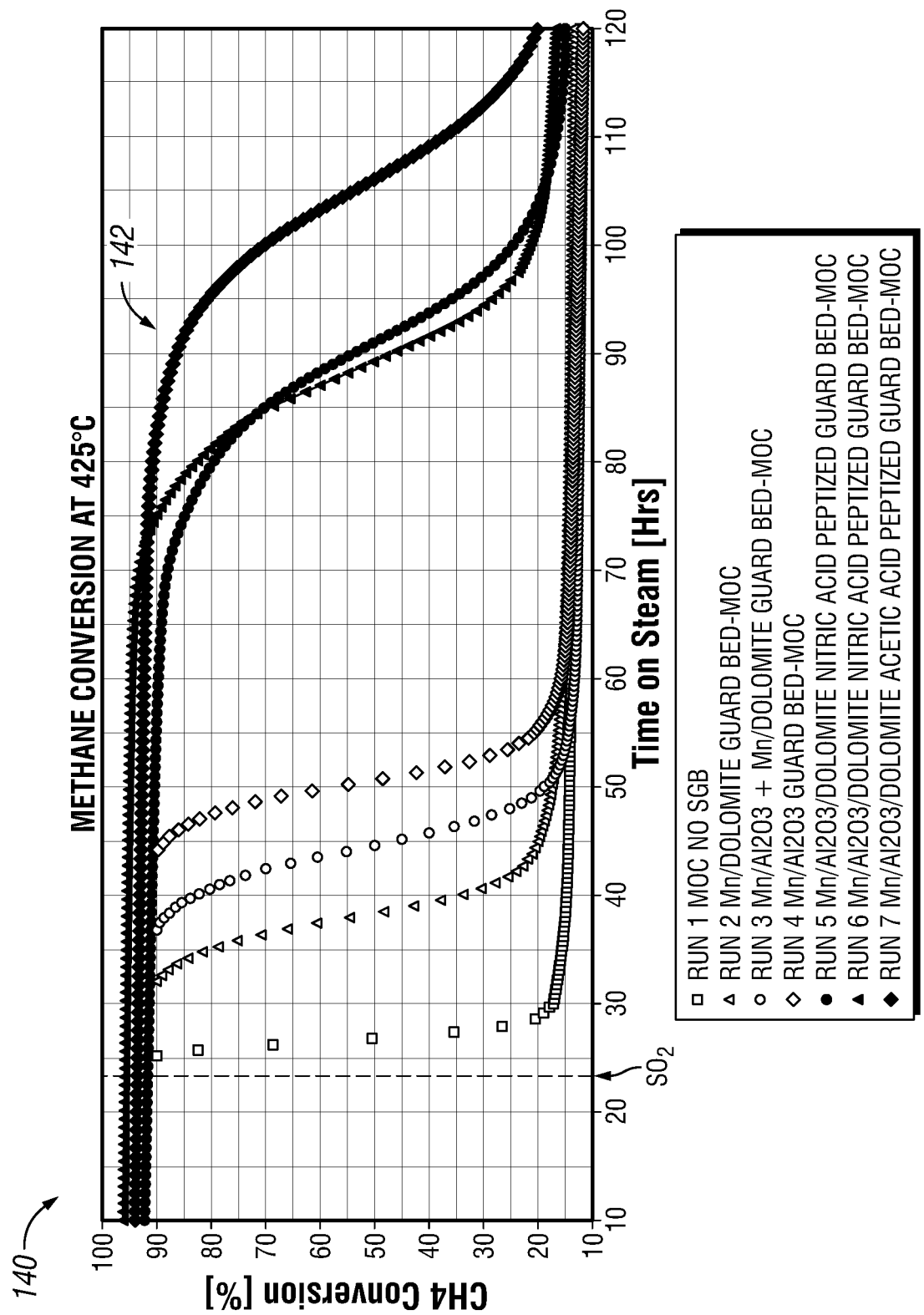
FIG. 8 is an exemplary plot of percent methane conversion as a function of time on stream obtained at a temperature of 425° C. for various guard bed formulations positioned upstream of the MOC, in accordance with an embodiment of the present disclosure.

FIG. 8 is a plot 140 of the percent methane conversion as a function of the time (hrs) on stream at a temperature of 425° C. for different guard bed materials placed in front of a MOC. Data 142 were obtained by testing powder (315-500 μm fraction) guard bed/MOC samples in a 16 reactor high-throughput testing rig. For each guard bed/MOC run, a total of 2 mL of guard bed/MOC samples were loaded into each reactor of the test rig. A weight ratio of the guard bed powder to the MOC powder loaded in the respective reactors was maintained at approximately 1.9:1. The guard bed and MOC powders were diluted with inert silicon carbide (SiC), 315-500μ fraction, particles to achieve a volume of 1 mL for each respective guard bed and MOC powders. Table 2 below lists the guard bed formulations used for each respective run. The following operating conditions were used: GSHV=100,000 h$^{-1}$, reactor temperature (RxT)=425° C. The exhaust gas feed composition was aS follows: 2000 ppm $CH_4$, 350 ppm CO, 4.5% $CO_2$, 10.5% 02, 150 ppm NO, 12 percent volume (% vol) of $H_2O$, and $N_2$ for the remaining balance to 100%. The MOC used was a washcoated MOC catalyst having 4% wt Pd, 0.5% wt Pt, 0.125% wt Rh on $ZrO_2$. The addition of 1.5 ppm of $SO_2$ to the exhaust gas feed was initiated at 25 hrs on stream and maintained for the duration of the tests.

TABLE 2

REACTOR RIG TEST GUARD BED RUNS 1-7 at 425° C.

| RUN # | GUARD BED PREPARATION | GUARD BED COMPOSITION |
| --- | --- | --- |
| 1 | — | No Guard Bed-Control |
| 2 | EXAMPLE 19 | 8% wt Mn/dolomite-derived guard bed |
| 3 | EXAMPLE 18 | 8% $Al_2O_3$ guard bed example 18 |
| 4 | EXAMPLES 18 & 19 | Physical mixture of 8% wt Mn/$Al_2O_3$ + 8% wt Mn/dolomite-derived guard bed |
| 5 | EXAMPLE 20 & 22 | 8% wt Mn/Peptized w/Nitric Acid and Co-extruded pellets of $Al_2O_3$ and dolomite-derived particles |
| 6 | EXAMPLE 20 & 22 | 8% wt Mn/Peptized w/Nitric Acid and Co-extruded pellets of $Al_2O_3$/dolomite-derived particles |
| 7 | EXAMPLE 21 & 22 | 8% wt Mn/Peptized w/Acetic Acid and Co-extruded pellets of $Al_2O_3$/dolomite-derived particles |

As shown in FIG. 8, the data 142 indicates that, prior to the addition of $SO_2$ (1.5 ppm), all samples had approximately 92-97% $CH_4$ conversion. Notably, the $CH_4$ conversion/oxidation activity was stable for all samples up until addition of the $SO_2$. Following addition of the $SO_2$ at 25 hrs on stream, the $CH_4$ conversion/oxidation activity of the MOC in the absence of the guard bed (Run 1) rapidly declined. For example, within 5 hrs after addition of the $SO_2$ the $CH_4$ conversion/oxidation activity of the MOC was less than 20% $CH_4$ conversion. In contrast, test runs having the disclosed guard bed, the MOC maintained a $CH_4$ conversion for a period of time longer than Run 1, which did not have the guard bed. For example, the $CH_4$ conversion of the MOC was improved when guard beds having the low porosity 8% wt Mn/dolomite-derived guard bed (Run 2) and the high porosity 8% wt Mn/$Al_2O_3$ guard bed sample (Run 3) were used. As shown by the data 142, the high porosity 8% wt Mn/$Al_2O_3$ guard bed composition was better compared to the low porosity 8% wt Mn/dolomite-derived guard bed formulation in improving the $CH_4$ conversion/methane oxidation activity of the MOC. Not wishing to be bound by theory, the improved $CH_4$ methane conversion/oxidation activity of the MOC may be attributed to the $SO_2$ conversion and capturing by active $MnO_2$ centers and $Al_2O_3$ or dolomite support surfaces of the disclosed guard bed formulations. Moreover, as illustrated in FIG. 8, MOC used in combination with the $Al_2O_3$ based guard bed had a better $CH_4$ conversion/oxidation activity compared to the dolomite-derived based guard bed. This may be due, in part, to a higher $SO_2$ uptake capacity of the higher pore volume (e.g., 0.868 mL/g) of the $Al_2O_3$ based guard bed compared to that of the lower pore volume (e.g., 0.17 mL/g) for the dolomite-derived based guard bed, For example, the higher porosity (e.g., pore volume) of the $Al_2O_3$ based guard bed provides for a greater $MnO_2$ dispersion and accessibility and, consequently, greater $SO_2/SO_3$ deposition and reactivity with and retention within the $Al_2O_3$ (in the form of $Al_2(SO_4)_3$) relative to the low porosity dolomite-derived based guard bed.

When using a physical mixture of the high porosity $Al_2O_3$ pellets and low porosity dolomite-derived pellets as in Run 4, the ability for the guard bed to capture $SO_2$ was improved and the $CH_4$ conversion/methane oxidation activity of the MOC was maintained for a longer period of time compared to runs using either the high porosity $Al_2O_3$ pellets (Run 3) and dolomite-derived pellets (Run 2) alone in the guard bed. However, in runs in which co-extruded high porosity $Al_2O_3$ and dolomite-derived pellets were used in the guard bed (e.g., Runs 5-7), the MOC unexpectedly exhibited significantly higher $CH_4$ conversion/methane oxidation stability compared to runs having discrete pellets of the Mn/$Al_2O_3$ component (Run 3), the Mn/dolomite-derived component (Run 2), or a physical mixture of the Mn/$Al_2O_3$ and Mn/dolomite-derived components (Run 4). For example, as shown by the data 142, the MOC used in combination with the guard beds having the co-extruded $Al_2O_3$ and dolomite-derived pellets (Runs 5-7) maintained $CH_4$ conversion/oxidation activity more than 40 hours after addition of the $SO_2$. Not to be bound by theory, the unexpected $CH_4$ conversion/oxidation of the MOC when used in conjunction with the co-extruded $Al_2O_3$/dolomite-derived pellets may be due, in part, to the fact that coextrusion of small $Al_2O_3$ and dolomite-derived particles and subsequent chemical bonding between them imparts the desired chemical functionality (both $Al_2O_3$- and dolomite-derived active for catalytic poisons removing sites), a higher porosity (water pore volume of 0.50 to 0.55 mL/g for nitric acid and acetic acid, respectively) than dolomite particles alone, and accessibility into the relatively low porosity (water pore volume of 0.17 cc/g) dolomite-derived particles facilitate reactivity with $SO_2$ and other exhaust gas poisons molecules. It should be noted that in Run 7, the MOC used in conjunction with the guard bed having the 8% wt/acetic acid peptized co-extruded $Al_2O_3$ and dolomite-derived particles) had significantly better $CH_4$ conversion/oxidation activity stability relative to the nitric acid peptized analogs (Runs 5 and 6). This may be due, in part, to the greater pore forming ability of bulkier acetic acid molecule compared to nitric acid molecules.

Figure 10:
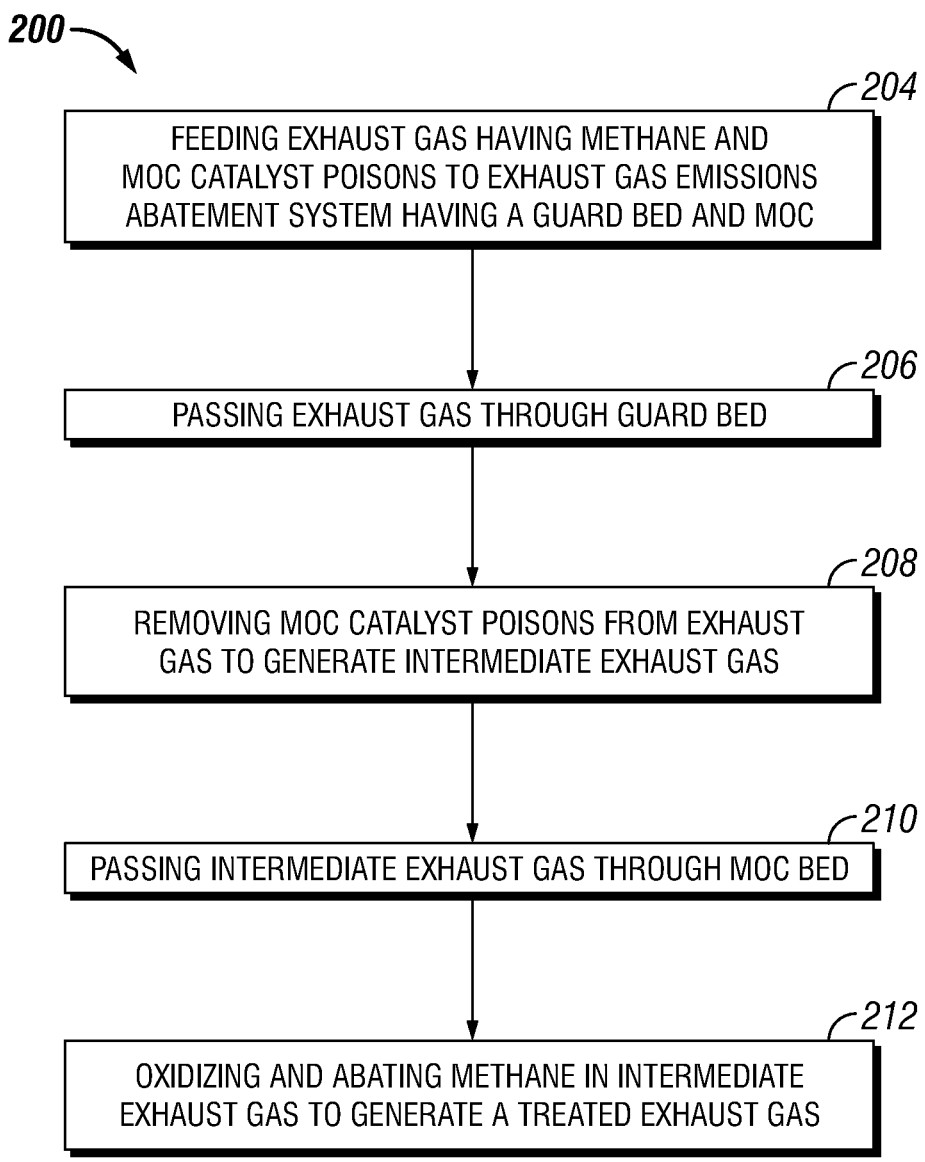
FIG. 10 is a flow diagram of a method for treating an exhaust gas produced by a natural gas fueled engine, having methane and MOC poisons using the system of FIG. 1, in accordance with an embodiment of the present disclosure.

In addition to testing the guard bed formulations disclosed herein at 425° C., the guard bed formulations were tested for their ability to remove MOC poisons from the exhaust gas at higher temperatures (e.g., at 470° C. FIG. 10 is a plot 146 of percent methane conversion as a function of time (hrs) on stream at 470° C. for different guard bed materials placed in front of an MOC. Similar to the samples discussed above with reference to FIG. 8, each reactor of the test rig was loaded with a total of 2 mL of guard bed/MOC. The guard bed powder to MOC powder loaded in each respective reactor had a weight ratio of approximately 1.9:1. Inert SiC was used to dilute the guard bed and MOC powders to yield a volume of 1 mL for each respective powder. Table 3 below lists the guard bed formulations used for each respective run. The operating conditions were as follows: GSHV=100,000 $h^{-1}$ and RxT=470° C. The exhaust gas feed composition was as follows: 2000 ppm $CH_4$, 350 ppm CO, 4.5% $CO_2$, 10.5% $O_2$, 150 ppm NO, 12 percent volume (% vol) of $H_2O$ and $N_2$ for the remaining balance. The MOC used was a washcoated MOC catalyst having 4% wt Pd, 0.5% wt Pt, 0.125% wt Rh on $ZrO_2$. The addition of 1.5 ppm of $SO_2$ to the exhaust gas feed was initiated at 25 hrs on stream and maintained for the duration of the tests.

TABLE 3

REACTOR RIG TEST GUARD BED RUNS 8-11 at 470° C.

| RUN # | GUARD BED PREPARATION | GUARD BED COMPOSITION |
|---|---|---|
| 8 | — | No Guard Bed-Control |
| 9 | EXAMPLE 19 | 8% wt Mn/dolomite-derived guard bed |
| 10 | EXAMPLES 18 & 19 | Physical mixture of 8% wt Mn/$Al_2O_3$ + 8% wt Mn/dolomite-derived guard bed |
| 11 | EXAMPLE 20 & 22 | 8% wt Mn/Peptized w/Nitric Acid and Co-extruded pellets of $Al_2O_3$ and dolomite-derived particles |

Figure 9:
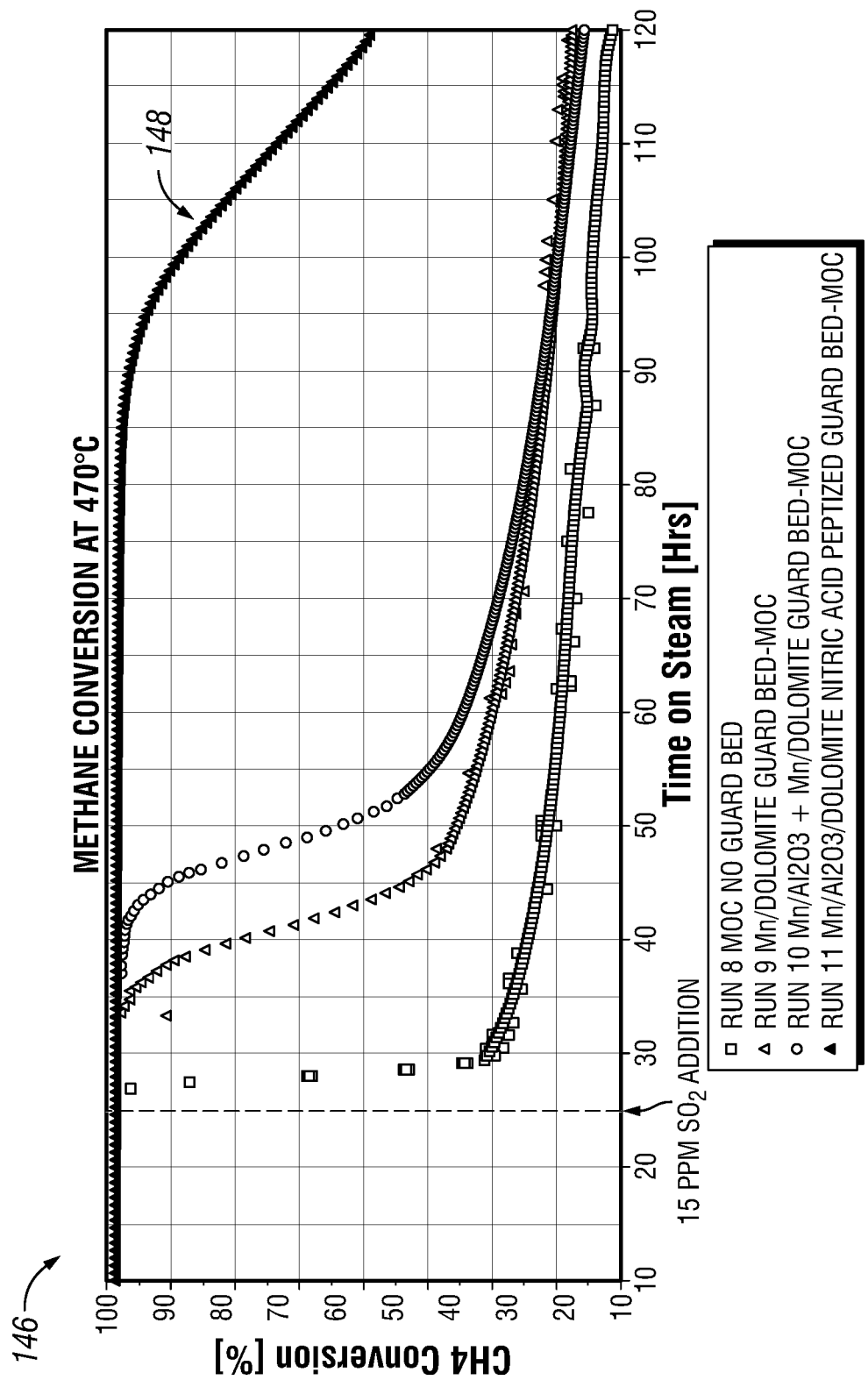
FIG. 9 is an exemplary plot of percent methane conversion as a function of time on stream obtained at a temperature of 470° C. for various guard bed formulations positioned upstream of the MOC, in accordance with an embodiment of the present disclosure.

As shown in FIG. 9, data 148 indicates that, prior to the addition of $SO_2$, all samples resulted in approximately 99-100% $CH_4$ conversion. However, upon the addition of $SO_2$ at 25 hrs on stream, the $CH_4$ conversion/oxidation activity of the control MOC sample without guard bed (Run 8) rapidly declined. In contrast, test runs having the disclosed guard bed components (Runs 9-11) positioned in front of the MOC bed enabled the MOC to maintain a desired $CH_4$ conversion/oxidation activity for greater than 10 hrs after addition of the $SO_2$. Similar to the data 142 in FIG. 8, the data 148 for samples having both the high porosity $Al_2O_3$ and the low porosity dolomite-derived powders resulted in improved $CH_4$ conversion/oxidation activity of the MOC. However, unexpectedly, at the higher operating temperature of 470° C., the 8% wt Mn on nitric acid peptized co-extruded $Al_2O_3$ and dolomite guard bed (Run 11) had significantly higher $CH_4$ conversion/oxidation activity relative to the control MOC sample and the other guard bed formulations. Accordingly, the performance data shown in FIGS. 5-9 clearly shows the substantial benefits and performance advantages of the guard beds formulations disclosed herein for efficient removal of $SO_2$ and other MOC poisons from exhaust gas generated by natural gas fueled engines.

Present techniques also include a method for methane emissions abatement in an exhaust gas generated in a natural gas operated engine system. FIG. 10 is a flow diagram of an embodiment of a method 200 by which an exhaust gas emissions abatement system (e.g., the exhaust gas emissions abatement system 14 described above) may treat an exhaust gas (e.g., the exhaust gas 28) having methane and methane oxidation catalyst (MOC) poisons. The method 200 includes feeding (block 204) an exhaust gas (e.g., the exhaust gas 28) having $CH_4$ and catalyst poisons to an exhaust gas emissions abatement system (e.g., the exhaust gas emissions abatement system 14) having a guard bed (e.g., the guard bed 36, 50, 96), as described above with reference to FIGS. 1-4. The method 200 also includes passing (block 206) the exhaust gas through a guard bed (e.g., the guard bed 36, 50, 96). As discussed above, the guard bed may have a single layer or multiple layers of a MOC poisons capturing component. Additionally, the MOC poisons capturing component may be a single component or a multi-component material having a transition metal oxide supported on an $Al_2O_3$ support material, dolomite-derived support material, or both.

The method 200 also includes removing (block 208) catalyst poisons from the exhaust gas to generate an intermediate exhaust gas (e.g., the intermediate exhaust gas 42). For example, as discussed above, guard beds containing transition metal oxides and $Al_2O_3$ and dolomite-derived materials may react, convert, adsorb, and capture catalyst poisons making them unable to pass through the guard bed and adversely affect the performance and catalyst life of the MOC. The intermediate exhaust gas exiting the guard bed is substantially devoid of catalyst poisons that may adversely affect the catalytic performance/activity and overall useful life of the MOC.

The method 200 further includes passing (block 210) the intermediate exhaust gas through a bed of MOC (e.g., the MOC bed 40) and oxidizing and abating (block 212) methane in the intermediate exhaust gas to generate a treated exhaust gas (e.g., the treated exhaust gas 50) having less than approximately 150-200 ppmv of methane. By removing the catalyst poisons upstream of the MOC bed, the guard bed of the present disclosure allows the MOC to fully exert its methane oxidation activity. That is, the MOC may efficiently and effectively convert more than approximately 80% of the methane in the intermediate exhaust gas. As such, the guard bed/MOC system disclosed herein provides for the treated exhaust gas released from the system to have methane emissions levels that are at or below the desired or regulated emissions levels.

As described above, certain embodiments of the system and method disclosed herein may include a catalyst poisons capturing guard bed positioned upstream of a methane oxidation catalyst (MOC) bed. The guard bed includes one or more components that react, convert, adsorb, and thereby remove and/or capture catalyst poisons such as sulfur dioxide ($SO_2$), phosphorus (P), zinc (Zn), calcium (Ca), silicon (Si) among others, that would otherwise poison and adversely affect the performance of the MOC in the methane abatement unit. The guard bed may include single or multiple layers having single MOC poisons capturing component or multiple MOC poisons capturing components arranged in a consecutive or mixed configuration. The MOC poisons capturing components in the guard bed may include transition metals (in oxide form), aluminum oxide ($Al_2O_3$), dolomite-derived materials, or both. By employing the exhaust gas emissions abatement system of the present disclosure the methane present in exhaust gasses generated in lean-burning natural gas engines may be removed via methane oxidation catalysts in an effective and efficient manner. Accordingly, exhaust gasses released from natural gas engines equipped with the exhaust gas emissions abatement system having the methane abatement unit disclosed herein may have methane emissions levels that are at or below the desired or regulated emission levels.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

We claim:

1. A system for removing methane oxidation catalyst (MOC) poisons from an exhaust gas, comprising:
   a methane abatement unit configured to receive the exhaust gas comprising methane ($CH_4$) and the MOC poisons, wherein the methane abatement unit comprises:
   a guard bed configured to remove the MOC poisons from the exhaust gas and to generate an intermediate exhaust gas comprising the $CH_4$ and devoid of the MOC poisons, wherein the guard bed comprises a MOC poisons capturing component comprising a first transition metal oxide, an aluminum oxide ($Al_2O_3$) support material, and a dolomite-derived support material, and wherein the MOC poisons capturing component is a co-extrudate of the first transition metal oxide, the $Al_2O_3$ support material, and the dolomite-derived support material such that the MOC capturing component is a single component; and
   a MOC bed fluidly coupled to and positioned downstream from the guard bed, wherein the MOC bed comprises a MOC and is configured to remove $CH_4$ from the intermediate exhaust gas to generate a treated exhaust gas having less than approximately 200 parts per million volume (ppmv) $CH_4$.

2. The system of claim 1, wherein the guard bed is a single layer bed.

3. The system of claim 1, wherein the first transition metal oxide concentration in the MOC poisons capturing component is between approximately 3-20% wt.

4. The system of claim 1, wherein the dolomite-derived support material is dolomite ($CaMg(CO_3)_2$), calcium magnesium oxide ($CaMgO_2$), a mixture of lime (CaO) and MgO, or a combination thereof.

5. The system of claim 1, wherein the first transition metal oxide is an oxide of manganese (Mn), vanadium (V), copper (Cu), and combinations thereof.

6. A method for removing methane oxidation catalyst (MOC) poisons from an exhaust gas, comprising:
   feeding the exhaust gas comprising methane ($CH_4$) and the MOC poisons to a methane abatement unit comprising a guard bed and a MOC bed fluidly coupled to and downstream from the guard bed;

contacting the exhaust gas with a MOC poisons capturing component disposed within the guard bed, wherein the MOC poisons capturing component comprises a first transition metal oxide, an aluminum oxide ($Al_2O_3$) support material, and a dolomite-derived support material, and wherein the MOC poisons capturing component is a co-extrudate of the first transition metal oxide, the $Al_2O_3$ support material, and the dolomite-derived support material such that the MOC capturing component is a single component; and removing the MOC poisons from the exhaust gas to generate an intermediate exhaust gas devoid of MOC poisons and comprising the $CH_4$.

7. The method of claim 6, wherein the contacting step comprises passing the exhaust gas through a single layer of the MOC poisons capturing component.

8. The method of claim 6, comprising feeding the intermediate gas to the MOC bed having a MOC and removing the $CH_4$ from the intermediate gas to generate a treated exhaust gas having less than approximately 200 parts per million volume (ppmv) $CH_4$.

9. A methane oxidation catalyst (MOC) poisons capturing component for removing MOC poisons from an exhaust gas, comprising:
 an aluminum oxide ($Al_2O_3$) support material having a first porosity;
 a dolomite-derived support material having a second porosity that is less than the first porosity; a first transition metal oxide wherein a concentration of the first transition metal oxide is between approximately 1-25 weight % (wt %), and wherein the MOC poisons capturing component is a co-extrudate of the first transition metal oxide, the $Al_2O_3$ support material, and the dolomite-derived support material such that the MOC capturing component is a single component; and wherein the MOC poisons capturing component removes sulfur dioxide ($SO_2$), phosphorus (P), calcium (Ca), zinc (Zn), silicon (Si) and ash.

10. The MOC poisons capturing component of claim 9, wherein the dolomite-derived support material is dolomite ($CaMg(CO_3)_2$), calcium magnesium oxide ($CaMgO_2$), a mixture of lime (CaO) and MgO, or a combination thereof.

11. The MOC poisons capturing component of claim 9, wherein the transition metal oxide is an oxide of manganese (Mn), vanadium (V), copper (Cu), and combinations thereof.

12. The MOC poisons capturing component of claim 9, wherein the first porosity is greater than approximately 2.0 milliliters (mL)/gram (g).

13. The MOC poisons capturing component of claim 9, wherein the second porosity is less than approximately 0.2 mL/g.

14. A system for removing methane oxidation catalyst (MOC) poisons from an exhaust gas, comprising:
 a methane abatement unit configured to receive the exhaust gas comprising methane ($CH_4$) and the MOC poisons, wherein the methane abatement unit comprises:
  a guard bed configured to remove the MOC poisons from the exhaust gas and to generate an intermediate exhaust gas comprising the $CH_4$ and devoid of the MOC poisons, wherein the guard bed comprises a MOC poisons capturing component comprising a first layer comprising a first transition metal oxide and an aluminum oxide ($Al_2O_3$) support material, and a second layer comprising a second transition metal oxide and a dolomite-derived support material, and wherein the second transition metal is the same or different from the first transition metal; and
  a MOC bed fluidly coupled to and positioned downstream from the guard bed, wherein the MOC bed comprises a MOC and is configured to remove $CH_4$ from the intermediate exhaust gas to generate a treated exhaust gas having less than approximately 200 parts per million volume (ppmv) $CH_4$.

15. The system of claim 14, wherein the guard bed is a single layer bed.

16. The system of claim 14, wherein the first transition metal oxide concentration in the MOC poisons capturing component is between approximately 3-20% wt.

17. The system of claim 14, wherein the dolomite-derived support material is dolomite ($CaMg(CO_3)_2$), calcium magnesium oxide ($CaMgO_2$), a mixture of lime (CaO) and MgO, or a combination thereof.

18. The system of claim 14, wherein the first transition metal oxide is an oxide of manganese (Mn), vanadium (V), copper (Cu), and combinations thereof.

\* \* \* \* \*